US007693621B1

(12) United States Patent
Chamas

(10) Patent No.: US 7,693,621 B1

(45) Date of Patent: Apr. 6, 2010

(54) APPARATUS AND METHODS FOR DISPLAYING ARRIVAL, APPROACH, AND DEPARTURE INFORMATION ON A DISPLAY DEVICE IN AN AIRCRAFT

(75) Inventor: Bassam H. Chamas, Redondo Beach, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 914 days.

(21) Appl. No.: 11/475,041

(22) Filed: Jun. 27, 2006

(51) Int. Cl.
*G01S 1/08* (2006.01)
*B64F 1/18* (2006.01)

(52) U.S. Cl. ............................ 701/16; 340/951; 342/33

(58) Field of Classification Search ..................... 701/1, 701/16, 200, 211; 340/947, 951; 342/33-35; 73/178 T
See application file for complete search history.

(56) References Cited

U.S. PATENT DOCUMENTS

| | | | | |
|---|---|---|---|---|
| 3,521,228 | A * | 7/1970 | Izumi et al. | 340/973 |
| 3,701,279 | A | 10/1972 | Harris et al. | |
| 3,746,844 | A | 7/1973 | Azum et al. | |
| 3,825,180 | A * | 7/1974 | Gallagher | 235/78 R |
| 4,831,538 | A | 5/1989 | Cucchiari et al. | |
| 4,890,232 | A * | 12/1989 | Mundra | 701/120 |
| 4,980,833 | A | 12/1990 | Milligan et al. | |
| 5,025,382 | A | 6/1991 | Artz | |
| 5,202,690 | A | 4/1993 | Frederick | |
| 5,331,330 | A | 7/1994 | Susnjara | |
| 5,521,827 | A | 5/1996 | Lindberg et al. | |
| 5,548,517 | A | 8/1996 | Nance | |
| 5,758,297 | A | 5/1998 | Gaultier | |
| 6,049,754 | A * | 4/2000 | Beaton et al. | 701/204 |
| 6,057,786 | A | 5/2000 | Briffe et al. | |
| 6,085,129 | A | 7/2000 | Schardt et al. | |
| 6,094,608 | A | 7/2000 | Bomans et al. | |
| 6,112,141 | A | 8/2000 | Briffe et al. | |
| 6,128,951 | A | 10/2000 | Nance | |
| 6,317,659 | B1 | 11/2001 | Lindsley et al. | |
| 6,392,661 | B1 | 5/2002 | Tankersley | |

(Continued)

FOREIGN PATENT DOCUMENTS

EP 0 381 164 A3 8/1990

(Continued)

OTHER PUBLICATIONS

G1000 Pilot's Training Guide, Garmin International, Inc., P/N 190-00368-00 Rev. E, Aug. 2005. (76 pages).

(Continued)

*Primary Examiner*—Yonel Beaulieu
(74) *Attorney, Agent, or Firm*—Finnegan, Henderson, Farabow, Garrett & Dunner, L.L.P.

(57) ABSTRACT

Systems and methods of the present disclosure are used to determine and display arrival, approach, and departure information on a display device in an aircraft, such as a moving map on a multi-function display. An arrival, approach, and/or departure may be received by a flight computer such that the arrival, approach, and/or departure information may be determined based on related approach procedures. Adjustments to navigational instruments may also be made. A pilot may then use the arrival, approach, and/or departure information to safely fly the arrival, approach and/or departure.

91 Claims, 14 Drawing Sheets

U.S. PATENT DOCUMENTS

| | | | | |
|---|---|---|---|---|
| 6,480,120 | B1 | 11/2002 | Meunier | |
| 6,512,527 | B1 | 1/2003 | Barber et al. | |
| 6,591,171 | B1 | 7/2003 | Ammar et al. | |
| 6,633,810 | B1 | 10/2003 | Qureshi et al. | |
| 6,639,522 | B2 | 10/2003 | Derderian | |
| 6,690,296 | B2 * | 2/2004 | Corwin et al. | 340/961 |
| 6,690,298 | B1 | 2/2004 | Barber et al. | |
| 6,696,980 | B1 | 2/2004 | Langner et al. | |
| 6,930,617 | B2 | 8/2005 | Chamas et al. | |
| 7,152,332 | B1 | 12/2006 | Jain et al. | |
| 2002/0166246 | A1 | 11/2002 | Ganivet | |
| 2002/0193915 | A1 | 12/2002 | Miller | |
| 2003/0128122 | A1 | 7/2003 | Reynolds | |
| 2003/0135327 | A1 | 7/2003 | Levine et al. | |
| 2004/0124998 | A1 | 7/2004 | Dame | |
| 2004/0143393 | A1 | 7/2004 | Knecht et al. | |
| 2004/0230351 | A1 | 11/2004 | Rumbo et al. | |
| 2005/0004745 | A1 | 1/2005 | Rumbo et al. | |
| 2005/0203675 | A1 | 9/2005 | Griffin, III et al. | |
| 2006/0020374 | A1 | 1/2006 | Kenner | |
| 2007/0040011 | A1 | 2/2007 | Martincik et al. | |

FOREIGN PATENT DOCUMENTS

| | | | |
|---|---|---|---|
| EP | O 381 164 | A2 | 8/1990 |
| EP | 0 802 469 | A1 | 10/1997 |
| GB | 1 226 214 | | 3/1971 |
| WO | WO 85/01372 | | 3/1985 |
| WO | WO 93/16359 | | 8/1993 |

OTHER PUBLICATIONS

G1000 Pilot's Training Guide: Instructor's Reference, Garmin International, Inc., P/N 190-00368-04 Rev. A, Aug. 2005. (54 pages).

GNS 530/GNS 530A Pilot's Guide & Reference, Garmin International, Inc., P/N 190-00181-00 Rev. C, Apr. 2003. (198 pages).

GNS480 Color GPS/WAAS/NAV/COM: Pilot's Guide, Gamin International, Inc., P/N 560-0984-01 Rev. B, Sep. 2004. (158 pages).

FlightMax Entegra Primary Flight Display: Pilot's Guide, Avidyne Corporation, P/N 600-00081-000 Rev. 04, Feb. 20, 2003. (40 pages).

FlightLogic EFIS: Synthetic Vision Flight Display, Chelton Flight Systems Inc., Document No. 150-045240 Rev. H, EFIS Software Version 5.0B or later, 2005. (452 pages).

ICDS 2000 Primary Flight Display, ARNAV Systems Inc., Website at http://www.arnav.com/icds2pfd.htm, Sep. 19, 2001. (2 pages).

Iowa Research Partnership: Flight simulator tests new visual display system for pilots, ISGC Newsbrief #4, University of Iowa Website at http://www.public.iastate.edu/~isgc/NEWS/newsbrief.htm, Sep. 19, 2001. (8 pages).

Ken Funk, The AgendaManager Simulation Environment, Website at http://flightdeck.ie.orst.edu/CTM/amsim.html, Sep. 19, 2001. (3 pages).

Space age flight benefits from human touch, MicroTouch World, vol. III, No. 2, Website at http://www.microtouch.com/mthtml/07b1_Vol3_No2_Flight.htm, Sep. 19, 2001. (2 pages).

If you've always wanted a real glass cockpit. . . , CSI—Enrico Schiratti's Project Magenta, Website at http://www.bfsmedia.com/~cockpits/products/pfd/pfd_parts.html, Sep. 19, 2001. (5 pages).

The Primus 1000, Honeywell BCAS: Primus 1000: Electronic Flight Instruments systems (EFIS), Website at http://www.cas.honeywell.com/bcas/products/primus_1000_efis.cfm, Sep. 19, 2001. (2 pages).

Avidyne Announces Successful Cross-Country Flight of Lancair Columbia 400 Using Integrated Flight Deck Displays, Website at http://www.avidyne.com/Columbia400_info.htm, Sep. 19, 2001. (2 pages).

The 737 Virtual Flight Deck, Website at http://www.boeing.com/commercial/aeromagazine/aero_04/textonly/ps02txt.html, Sep. 19, 2001. (8 pages).

Sierra Flight Systems EFIS Symbology, Website at http://sierraflightsystems.com/symbology_base.html, Sep. 19, 2001. (16 pages).

E-Flight Airbus Primary Flight Display (PFD), Website at http://e-flight.com/a320pfd.htm, Sep. 19, 2001. (2 pages).

Essential Use Case for Creating a Primary Flight Display, Website at http://www.icaen.uiowa.edu/~kuhl/SoftEngSlides/Roger/HW1.htm, Sep. 19, 2001. (2 pages).

Primary Flight Display, Website at http://www.schiratti.com/magenta/details/pfd.html, Sep. 19, 2001. (3 pages).

NASA Lays Hands on HITS, Plane & Pilot, vol. 37, No. 10, Oct. 2001, pp. 3; 11. (2 pages).

Designer Vision, Plane & Pilot, vol. 37, No. 10, Oct. 2001. (2 pages).

Federal Aviation Regulations/Aeronautical Information Manual (FAR/AIM), U.S. Dept. Of Transportation, 2002. (pages 1-407).

"Do-it-yourself weighting machine approved," Flight International, Reed Business Information, Haywards Health, G.B., vol. 154, No. 4632, p. 30, Jul. 1, 1998. (1 page).

Payne B., "Aircraft Weighing," Measurement and Control, Institute of Measurement and Control, London, G.B., vol. 24, No. 4, pp. 102-104, May 1, 1991. (3 pages).

Federal Aviation Administration, "Instrument Flying Handbook," (FAA-H-8083-15), Ch. 7 ("Navigation Systems"), 2001.

Rod Machado, "Rod Machado's Instrument Pilot's Survival Manual, Second Edition," Chapter 8 ("The Art of the Approach"), Ch. 12 ("Equipment for the Approach"), Ch. 15 ("Approach Segments"), Ch. 17 ("Instrument Departures"), and Ch. 19 ("GPS RNAV & Approach Charts"), The Aviation Speakers Bureau, 2003.

Federal Aviation Administration Aeronautical Information Manual, Official Guide to Basic Flight Information and ATC Procedures, Chapter 5, Section 3 ("En Route Procedures"), available at: http://www.faa.gov/airports_airtraffic/air_traffic/oublications/ATpubs/AIM/Chap5/aim0503.html, updated Mar. 12, 2009, printed on Mar. 13, 2009.

U.S. Appl. No. 11/325,497, filed Jan. 5, 2006 (87 pages).

* cited by examiner

100

APPARATUS AND METHODS FOR DISPLAYING ARRIVAL, APPROACH, AND DEPARTURE INFORMATION ON A DISPLAY DEVICE IN AN AIRCRAFT

I. TECHNICAL FIELD

The present disclosure relates to assisting pilots in flying an arrival, approach, and departure to an airport. In particular, the present disclosure relates to apparatus and systems for determining and displaying information related to an arrival, approach, and departure on a display device in an aircraft.

II. BACKGROUND

Pilots of aircraft require a safe and reliable method to navigate to an airport and access a runway for landing. Visual flight rules (VFR), while at times preferable, are insufficient to allow a pilot to navigate and land in all weather conditions. For example, a pilot may be navigating to an airport at some distance from the originating airport and may encounter varying weather and landing conditions which limit visibility and make a VFR landing too treacherous. Because of limited fuel and other factors, a pilot must be able to land his aircraft even when VFR approach and landing methods are not practical. Therefore, procedures have been developed for instrument flight rules (IFR) navigation and landing. Such procedures are typically more dangerous and more complicated due to a reliance on numerous instruments within a cockpit and the inability to use visual cues from outside the aircraft. To enhance safety, approach and landing procedures may be defined by a series of rules and requirements identified and promulgated by an aviation regulating authority (e.g., Federal Aviation Administration). Pilots must understand that it is important that these procedures be strictly followed to avoid potential disaster.

Each runway at an airport may have different navigational aids available configured to facilitate IFR approach and landing methods on the particular runway. These navigational aids may include equipment related to, for example, non-directional beacon (NDB), VHF Omni-directional Radio (VOR), Global Positioning System (GPS), Localizer (LOC), and Instrument Landing System (ILS) approaches. Therefore, when flying an instrument approach, a pilot must be familiar with all of the possible approach methods for a particular runway and the related, available equipment. For example, during a VOR approach to a particular runway, a pilot may not be provided distance information if distance measuring equipment (DME) is disabled or not present. Therefore, the approach must be timed from a known fix with distance information calculated based on the time, aircraft velocity, and navigational charts. Such a task may substantially increase a pilot's cockpit workload. Further, VOR approaches provide no vertical guidance, leaving a pilot dependant on another instrument, an altimeter, while also monitoring the timer and performing distance calculations.

The approach methods related to equipment identified above may be divided into two categories, precision approaches and non-precision approaches. A precision approach is one that provides both electronic glideslope information and lateral guidance information. Non-precision approaches provide only lateral guidance information through standard navigational instruments. The glideslope typically refers to the descent profile during the final phase of an aircraft's approach for landing at an airport's runway. Therefore, because no glideslope information is available during a VOR, NDB, or localizer approach, they may be categorized as non-precision approaches. Current GPS approaches may also be non-precision, but procedures for precision GPS approaches may vary based on available equipment. ILS approaches are precision approaches providing both electronic glideslope information and lateral guidance. All of the approach methods utilize navigation radios, tuned to runway specific frequencies, and related cockpit instruments to approach and land using the published procedures. Each of the approach methods also require careful attention of the pilot to ensure that the approach is flown according to information received from the cockpit instruments.

While each approach method has the advantage of allowing a pilot to land where VFR is insufficient, each also has potential problems and difficulties that may increase the cockpit workload for a pilot. Some of these problems are common across the approach methods. For example, a pilot must be certain to tune navigation radios to the proper frequency to navigate to the proper airport. An incorrect frequency can lead to a pilot flying into an area he had no intention of flying into (such as an area with dangerous terrain). Further, to ensure that the navigation radios have been tuned properly, a pilot must quickly recognize the Morse code identifier received from a navigation aid when tuning the radios. During particularly stressful periods in the cockpit (e.g., landing in a thunderstorm), interpreting Morse code can add an additional level of unneeded complication for a pilot.

NDB approaches, while available at nearly all IFR certified airports, present numerous additional problems for pilots. For example, during an NDB approach, a pilot must be mindful of signal interference, twilight error, terrain error, and crosswinds, among other things. A pilot must constantly compensate for any and all of the potential problems to avoid disaster. Further, many pilots are not well trained in use of an auto direction finder (ADF) making NDB approaches particularly difficult to navigate correctly.

Obtaining a fix via VOR, while slightly more accurate than NDB, is generally no easier. To obtain a fix via VOR, two navigation stations must be tuned in and their directions found and plotted on a chart. Further, a VOR approach requires that omni-bearing selector (OBS) knobs be properly turned and aligned on the VOR instruments.

Navigating along lines between NDB or VOR stations can also be a difficult task. Radials change as the aircraft moves, and the preferred way to navigate via NDB or VOR is to plot the course and sample fixes along it before departure. Errors in navigation via NDB or VOR can be very difficult to correct, requiring a fix and then comparing the fix to one of the sample fixes plotted during pre-flight preparation (provided such preparation was completed and completed properly).

ILS approaches, while often the preferred IFR approach because of the availability of electronic glideslope information, utilize both a localizer and an electronic glideslope, introducing additional complexity and uncertainty to the approach. Should any of the equipment malfunction during the approach, the pilot may have to rely on other non-precision approach equipment. Further, should the pilot misread an approach plate and/or mistune a navigation radio, the pilot may be left wondering why the localizer and/or glideslope information is not present, when in fact, the pilot has tuned in the wrong runway or worse, the wrong airport.

Because IFR approach and landing procedures typically vary based on airport, runway, equipment availability (at a particular runway), and time of year, among other things, such procedures are regularly published (e.g., every two weeks) on a navigational chart, typically referred to as an approach plate or approach chart. Approach plates may be published in a variety of forms, and may be named according to the airport for which they were created. It is important that a pilot have reviewed the most recent published version of an approach plate to ensure up-to-date approach procedure information.

Two primary published approach plates, Jeppesen and the National Aeronautical Charting Office (NACO), are the most frequently used. Each of the plates show nearly identical information arranged using different layouts. The approach plates generally provide a pilot with navigation and approach information for each runway at an airport, and the approach plates may also provide surrounding terrain information in selected areas. Approach plates typically provide information including, for example, runway identifiers and configuration (e.g., alignment, available navigation equipment, etc.), navigation radio frequencies, landing minimums (e.g., minimum descent altitude, minimum vectoring altitude, minimum visibilities, etc.), missed approach point, missed approach procedures, critical approach information, altitude information, glideslope (if an ILS), and feeder routes, among other things.

Approach plates may organize approach information by dividing a sheet into several sections. The sections may include an approach plan section, a profile section, a minimums section, and an airport diagram section, among others.

The approach plan section may provide a view similar to a typical navigational chart view and may include airports, waypoints, airways, navigational aid frequencies, and other navigational information related to lateral flight (e.g., east, west, north, and south).

The approach plan view may provide a pilot with two-dimensional lateral guidance for flying an approach and landing in accordance with promulgated procedures for a selected destination airport and runway. Therefore, a pilot must be able to interpret the symbols of the approach plan view quickly and chart aircraft position on the approach plan view to determine additional navigational steps.

The profile section of an approach plate may add depth to the approach plan section by providing the third dimension of altitude. In other words, the profile view may provide vertical guidance as to an aircraft's position relative to the ground and the specified approach procedures. Once again, a pilot must plot the aircraft's current position on the profile view to determine whether an approach segment is being flown at the correct altitude as dictated by the specified procedures.

The minimums section may provide a pilot with information related to minimum altitudes, visibilities, etc., that a pilot must maintain to remain in compliance with the dictated approach procedures. For example, the minimums section may include a minimum descent altitude (MDA), which is the minimum altitude the aircraft may descend to during a non-precision approach before visually verifying the runway. The decision height (DH) is a similar concept related to precision approaches and may also be displayed in the minimums section. The DH may be the altitude on the glideslope at which a pilot must decide whether to continue landing or execute missed approach procedures. It is to be understood that, although not exactly equivalent to MDA, DH and MDA will be used interchangeably, where possible, in the course of this discussion. In another example, the minimums section may include a runway visual range (RVR), which is the minimum length of runway a pilot must be able to see to land on that runway. It is important that a pilot follow these minimums closely to remain in compliance with the approach procedures.

The airport diagram section may provide a pilot with detailed information including the layout of the airport runways, approach hardware, taxiways, amenities, fuel availability, etc. A pilot may use such information to assist in determining which runway/approach combination to select.

Approach plates may be difficult to interpret quickly and require that a pilot study them sufficiently in advance of flight to enable navigation, airport identification, and execution of approach procedures. Further, a pilot must chart aircraft position on both the approach plan section and the profile section of the approach plate continuously to determine the aircraft location relative to the references on the approach plate and whether the aircraft is maintaining flight within the specified approach procedures. Moreover, in the event of a missed approach, a pilot must refer to the approach plate quickly during a period of high stress to gain information allowing a safe exit from the current approach and enabling another attempt to land on the runway.

It may also be necessary from time to time for air traffic control (ATC) to modify specified approach procedures based on current conditions at a particular airport and runway. For example, ATC may determine that landing at a particular airport or runway is not possible (e.g., disabled aircraft on the runway, hardware malfunction, etc.) and may communicate instructions to navigate to another airport or approach another runway with different equipment (e.g., no ILS but only NDB). Because ATC commands take precedence over published approach procedures, a pilot must have related approach plates available and must have the skill and ability to fly an approach as directed by ATC. This may significantly increase cockpit workload and introduce additional levels of difficulty in the approach process.

From the above discussion, it is apparent to one of skill in the art that there is a need for a system and method for determining and displaying navigational information related to the various approach methods to assist pilots in flying an approach to an airport. There is also a need for automatically calculating and displaying an aircraft's position with respect to a published approach plate on a moving map such that a pilot may easily reference the information and adjust the aircraft's navigational parameters accordingly. Moreover, there is a need for a system which can automatically tune navigation radios based on a pre-programmed flight plan and approach parameters. Further, there is a need for a system which can automatically recognize approach parameters communicated by ATC and accurately enter the parameters into an automated system for assisting the pilot in flying a revised approach.

The present disclosure addresses these needs and other related needs in various embodiments of an automated system for displaying approach information on a display device in an aircraft.

III. SUMMARY OF THE INVENTION

Apparatus and methods of the present invention relate to a method for determining and displaying information related to an approach for an aircraft. The method may include the steps of receiving an approach for an airport and determining approach information based on the approach including navigation information and weather information, wherein the navigation information includes at least one navigational aid and the weather information includes at least a ceiling and a visibility at the airport. The method may further include displaying the approach information and the navigation information on a display device in the aircraft relative to a position of the aircraft.

In another embodiment of the invention, a method for determining and displaying information related to an approach for an aircraft is provided. The method may include the steps of receiving sound information including an identifier related to an approach for an airport, determining approach information based on the approach, and displaying the approach information on a display device in the aircraft relative to a position of the aircraft.

In yet another embodiment of the invention, a method for determining and displaying information related to an approach for an aircraft is provided. The method may include the steps of receiving digital data via a datalink including an identifier related to an approach for an airport, determining approach information based on the approach, and displaying the approach information on a display device in the aircraft relative to a position of the aircraft.

IV. BRIEF DESCRIPTION OF THE DRAWINGS

The accompanying drawings, which are incorporated in and constitute a part of this specification, illustrate embodiments of the disclosure and together with the description, serve to explain the principles of the disclosure. In the drawings.

V. DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

A. Introduction

The present disclosure relates to systems and methods for determining and displaying approach related information on a display device in an aircraft. In the following paragraphs, several examples of apparatus and methods for determining and displaying approach related information on a display device are provided. However, these examples are exemplary, and other apparatus and methods may be used for determining and displaying approach related information on a display device.

B. System Overview

Figure 1:
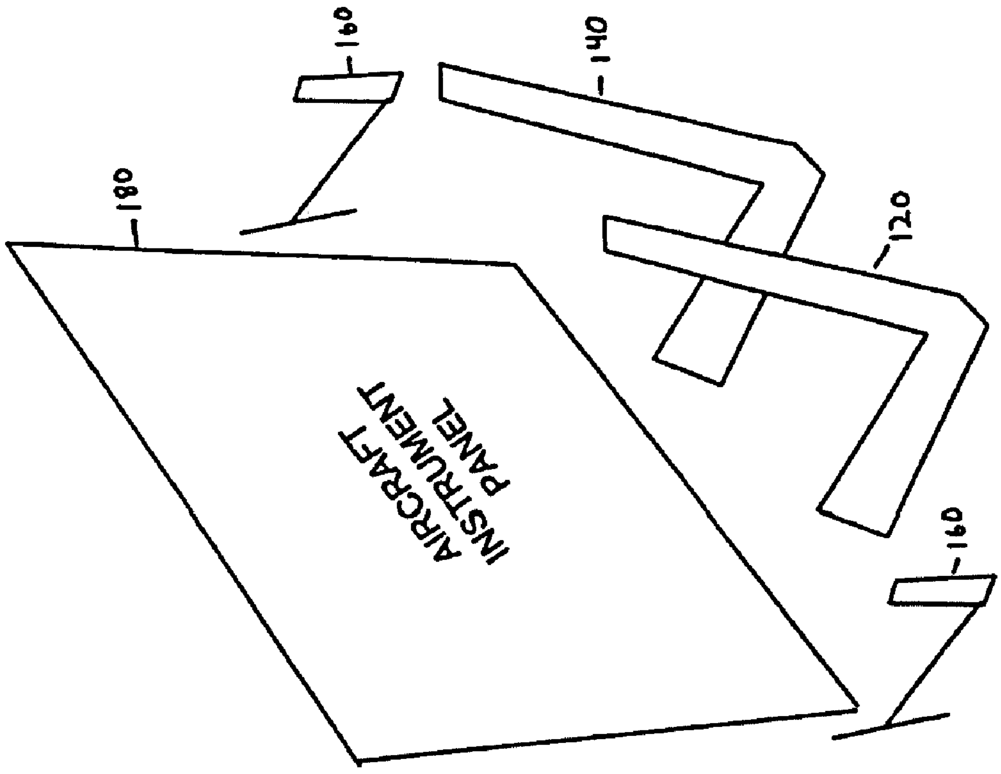
FIG. 1 is a representation of a cockpit in an aircraft with an aircraft instrument panel.

FIG. 1 is a representation of a cockpit in an aircraft with an aircraft instrument panel. As shown in FIG. 1, a cockpit 100 includes a pilot seat 120, a co-pilot seat 140, control mechanisms 160, and an aircraft instrument panel 180. The cockpit may also contain other components (not shown).

Figure 2:
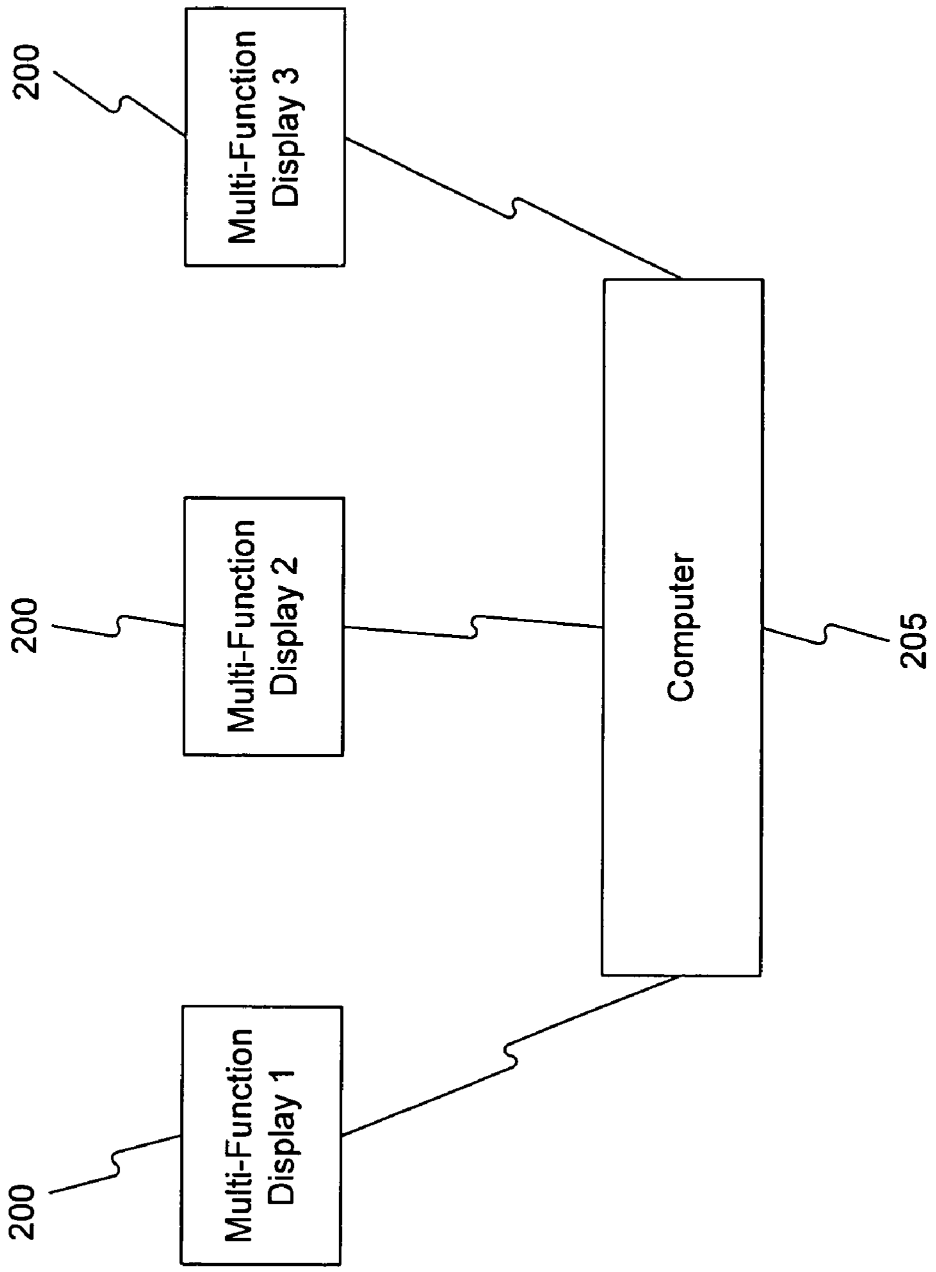
FIG. 2 is a block diagram of a bank of multi-function displays consistent with one embodiment of a cockpit in an aircraft.

FIG. 2 is a block diagram of a bank of multi-function displays (MFDs) consistent with one embodiment of a cockpit in an aircraft. MFD 200 may refer to any avionics display providing displays of multiple functions, such as a primary-function display (PFD). As is well-known to those skilled in the art, MFD 200 may be a CRT display, a plasma display, a LCD display, a touch sensitive display, or any other type of electronic device. A computer 205, discussed in greater detail below with reference to FIG. 3, is linked to MFD 200.

Figure 3:
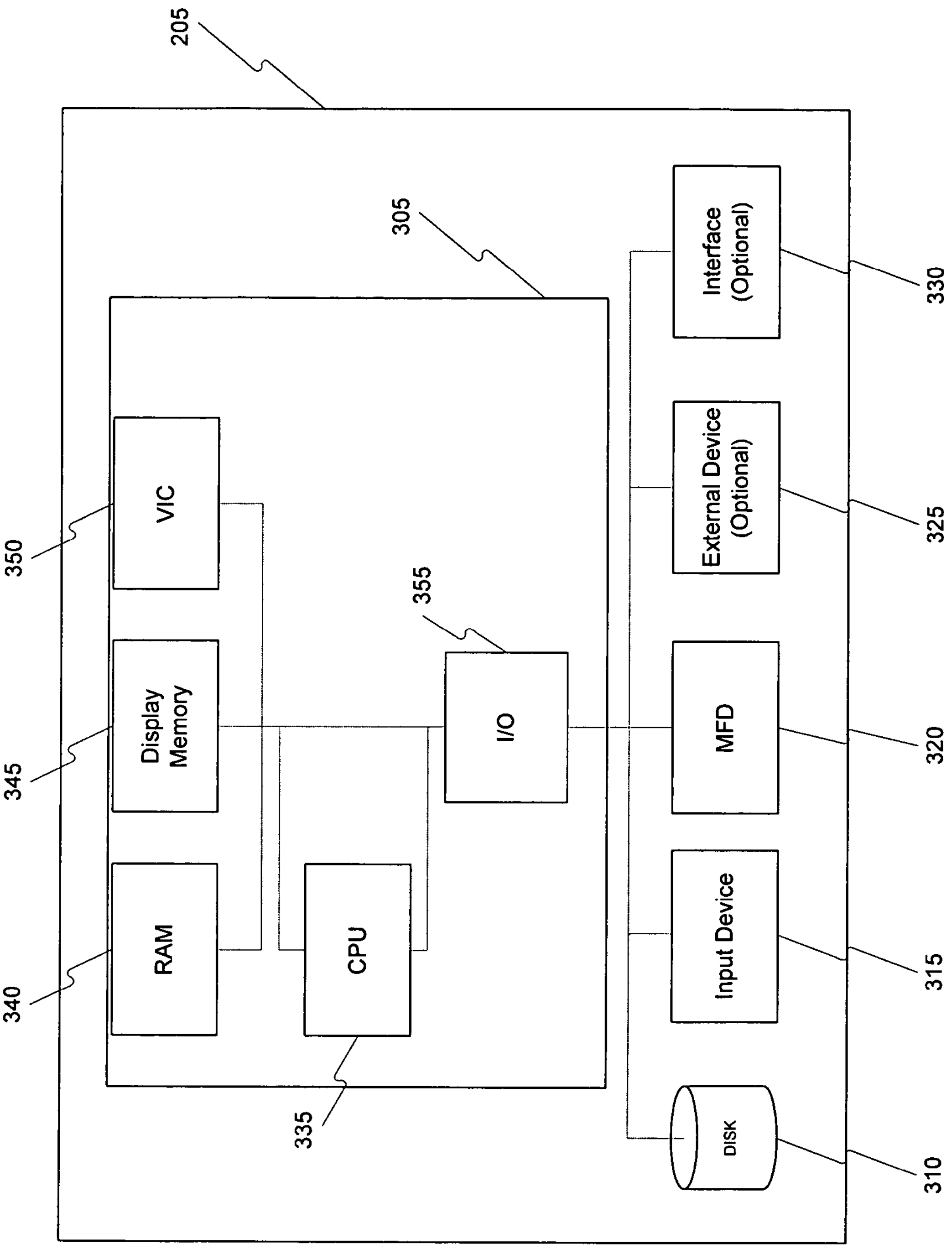
FIG. 3 is a block diagram of one embodiment of a computer for a multi-function display (MFD) consistent with a cockpit in an aircraft.

FIG. 3 is a block diagram of one embodiment of a computer for a MFD consistent with a cockpit in an aircraft. As shown in FIG. 3, in one implementation, computer 205 includes a processor 305, a disk 310, an input device 315, a MFD 320, an optional external device 325, and an optional interface 330. The computer may also include other components. In this implementation, processor 305 includes a CPU 335, which is connected to a random access memory (RAM) unit 340, a display memory unit 345, a video interface controller (VIC) unit 350, and an input/output (I/O) unit 355. The processor may also include other components.

In this implementation, disk 310, input device 315, MFD 320, optional external device 325, and optional interface 330 are connected to processor 305 via I/O unit 355. In this implementation, disk 310 contains the information that may be processed by processor 305 and displayed on MFD 320. Input device 315 includes the mechanism by which a user may access computer 205. Optional external device 325 allows computer 205 to interact with other devices (not shown). Optional interface 330 allows computer 205 to receive information other than by input device 315. As described above, computer 205 displays information on MFD 320. Other components or devices may also be attached to processor 305 via I/O unit 355. Other computers may also be used (e.g., for redundancy). These configurations are merely exemplary, and other implementations may also be used.

C. Description of the Embodiments

Generally, when a pilot desires to land using an IFR approach, a clearance may be requested of and issued by ATC.

Upon obtaining such a clearance, a pilot is required to perform numerous predefined tasks, while also maintaining control of the aircraft, to safely navigate the specified approach in compliance with the specified procedures. These tasks may depend on navigational aids present on the cleared airport runway and may include, for example, adjusting multiple navigational radios, adjusting omni-bearing selectors, monitoring VOR displays, monitoring a heading indicator, monitoring a clock or timer, calculating distances, monitoring glideslope compliance, etc. All of these functions require additional attention from the pilot during flight. Performing these tasks in addition to flying the aircraft can be very difficult, leading to safety concerns for the pilot, passengers, and other aircraft.

Systems and methods of the present disclosure are designed to assist a pilot in navigating the cleared approach by displaying approach related information on a display device, including, for example, a moving map. By utilizing embodiments of the present disclosure, a pilot may be able to view dynamic information from published approach plates as it relates to current aircraft circumstances and obtain navigation information related to flying the cleared approach, all with minimal pilot effort. Therefore, pilot resources are freed and may be devoted to other important tasks related to operation of the aircraft. Note that the following description refers generally to an approach, but this disclosure references an approach to refer to an instrument approach to an airport, a departure procedure from an airport, or an arrival procedure to an airport, among other similar instrument flight procedures.

Figure 4:
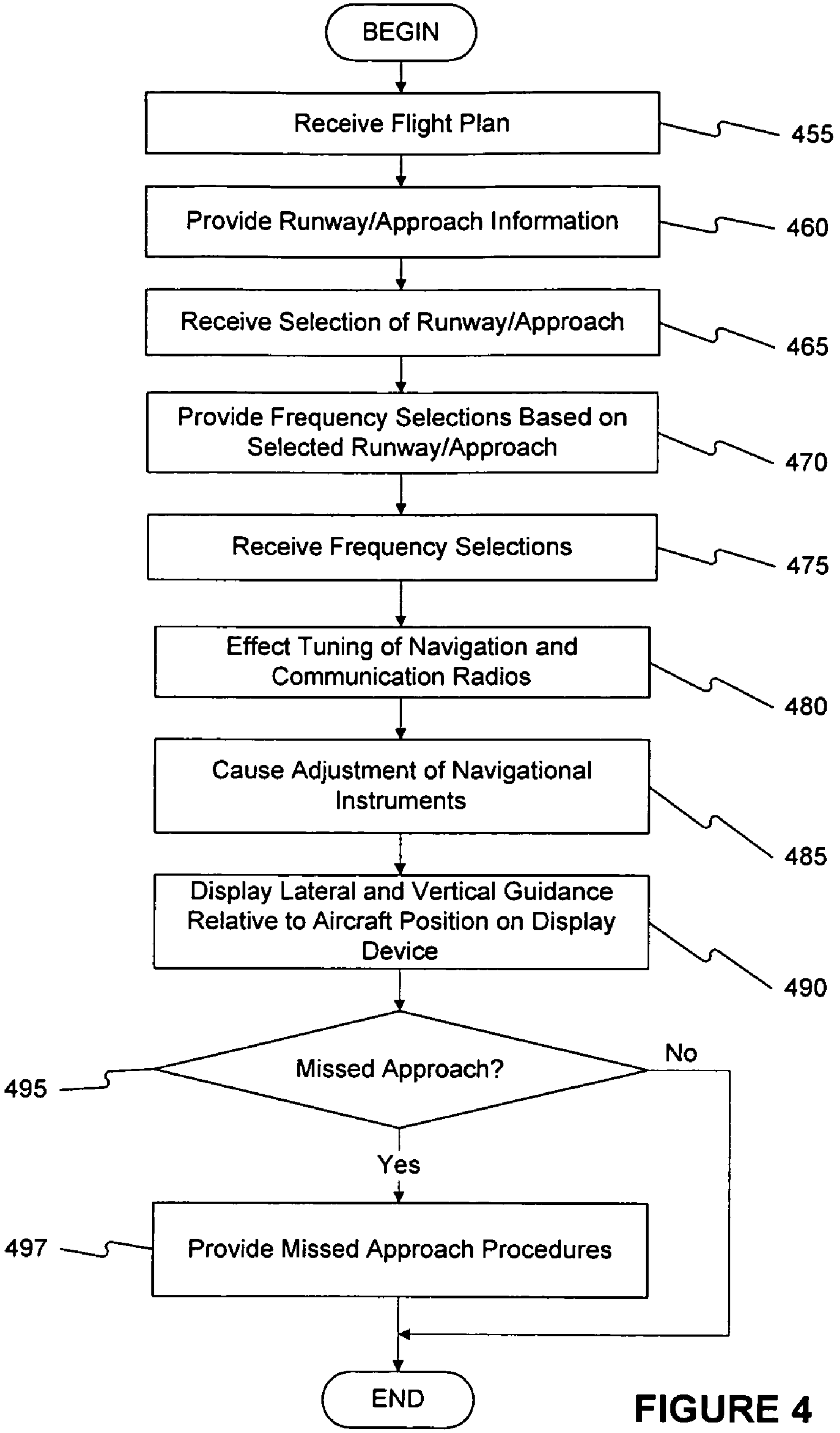
FIG. 4 is a high level flowchart depicting an exemplary method for displaying approach and landing related information on a display device consistent with one embodiment of the present disclosure.

FIG. 4 is a high level flowchart depicting an exemplary method for displaying approach and landing related information on a display device consistent with one embodiment of the present disclosure. In the following examples, according to embodiments consistent with the present disclosure, methods are described by which a pilot may utilize a display device to display approach and landing information. In this example, the pilot has provided a flight plan in advance of flight and has entered a destination airport. The pilot has selected a non-precision on-airport VOR approach to the destination airport. This selection is exemplary only and the disclosed systems and methods are equally applicable to any runway/approach combination.

Computer 205 may first receive a flight plan from a pilot (stage 455). For example, the pilot may utilize data entry methods known in the art for entering information including, for example, keypads, scanners, voice commands, datalink, etc. Entered information may include, for example, originating airport, destination airport, and assigned or preferred waypoints. Following the provision of a flight plan and navigation information to an area within range of the destination airport, computer 205 may provide information including airports, runway/approach combinations, and weather information related to the destination airport and surrounding airports (stage 460). Computer 205 may then provide such information on MFD 320, via audio information, and/or any other suitable method. Computer 205 may then receive a selection of a runway/approach combination (stage 465). The selection may be received from a pilot, or alternatively, ATC may provide the selection. ATC or the pilot may base such a decision on factors including, available runway equipment, weather conditions at the destination airport, runway orientation, and so forth. Further, computer 205 may compare approach information (e.g., approach plate) to the previously entered flight plan to confirm the selected approach is appropriate based on the flight plan. Based on the selection of a runway/approach combination, computer 205 may provide related navigation and communication frequencies for selection (stage 470). The frequencies may be the available frequencies at surrounding navigation aids and may be determined based on navigational charts. Alternatively, computer 205 may scan frequency ranges and identify navigation aids by Morse code identifiers emitted from the navigation aids. Computer 205 may next receive a selection of frequencies for tuning navigation and communication radios (stage 475). For example, a pilot approaching a destination airport may select a frequency of a VOR station at the destination airport for a first navigation radio and the frequency of an interim waypoint VOR station for a second navigation radio. Computer 205 may then cause navigation and communication radios to be tuned to the selected frequencies (stage 480). During this stage, computer 205 may once again verify that the selected frequency correlates with the desired navigational aid by checking the Morse code identifier and alerting the pilot via MFD 320. For example, upon tuning a first navigational radio to VOR station named "CIC," computer 205 may confirm the Morse code identifier and then display a confirmation (e.g., "Nav1 tuned to CIC" on MFD 320). Computer 205 may cause adjustment of navigation instruments (e.g., flight computers, flight directors, omni-bearing selector, and CDI) following radio tuning (stage 485). For example, tuning of a navigation radio to a VOR station typically requires adjustment of a related omni-bearing selector to produce accurate and useful navigation information. Adjustment of the omni-bearing selector may be effected by computer 205 following each tuning of a navigation radio so that pilot action is unnecessary. Alternatively, prompting of the adjustment may be effected by computer 205. Computer 205 may then calculate and display navigation information related to flying the selected approach according to the specified approach procedures (stage 490). MFD 320 may provide navigation information including, for example, real-time lateral and vertical guidance, terrain information, weather information, and estimated arrival times, among other things. A pilot may then navigate the aircraft according to the displayed information until the aircraft lands or the missed approach point is reached. If the missed approach point is reached (stage 495: yes), computer 205 may provide missed approach procedures (stage 497). For example, upon receiving a missed approach indication, computer 205 may display information including, for example, missed approach checklist, missed approach procedures, and vertical guidance information related to missed approach procedures. Where the aircraft lands successfully (stage 495: no), computer 205 may take no further action regarding the approach.

While the examples discussed herein generally describe stages associated with an on-airport VOR approach, the present disclosure is equally applicable to other runway and approach combinations for precision and non-precision approaches (i.e., off airport VOR, GPS, ILS, LOC, and so forth). More or fewer elements may be displayed as desired for each runway/approach combination without departing from the scope of this disclosure.

Further, data related to approach and landing may be received in multiple formats, for example, as datalink or as sound information. Sound information may be embodied as, for example, an audio signal reproduced by a speaker, a human voice, the output of a microphone, or an electronic audio signal passing to a line-in input of a device. Such data may be transmitted by ATC via radio, satellite, or other transmission means to an intended aircraft. Data related to an approach and landing may also be received in the form generally receivable by an aircraft's flight computer (e.g., digital data). Such data may be directly utilized by a computer within an aircraft without the need for any pilot action (e.g., data entry). For example, ATC may transmit information via radio, satellite, or other transmission means to an intended aircraft (such as via automatic dependent surveillance broadcast, or ADS-B). The data transmission from ATC may be received by the intended aircraft's flight computer causing computer 205 to enter "Approach" mode and display related information on MFD 320. Upon receiving such data, computer 205 may also cause an alert (e.g., sound, light, etc.) to issue thereby informing pilot of the ATC communication. Alternatively or in addition, ATC may inform the pilot of the delivery of data via standard communication methods (e.g., analog aircraft radio).

Figure 5:
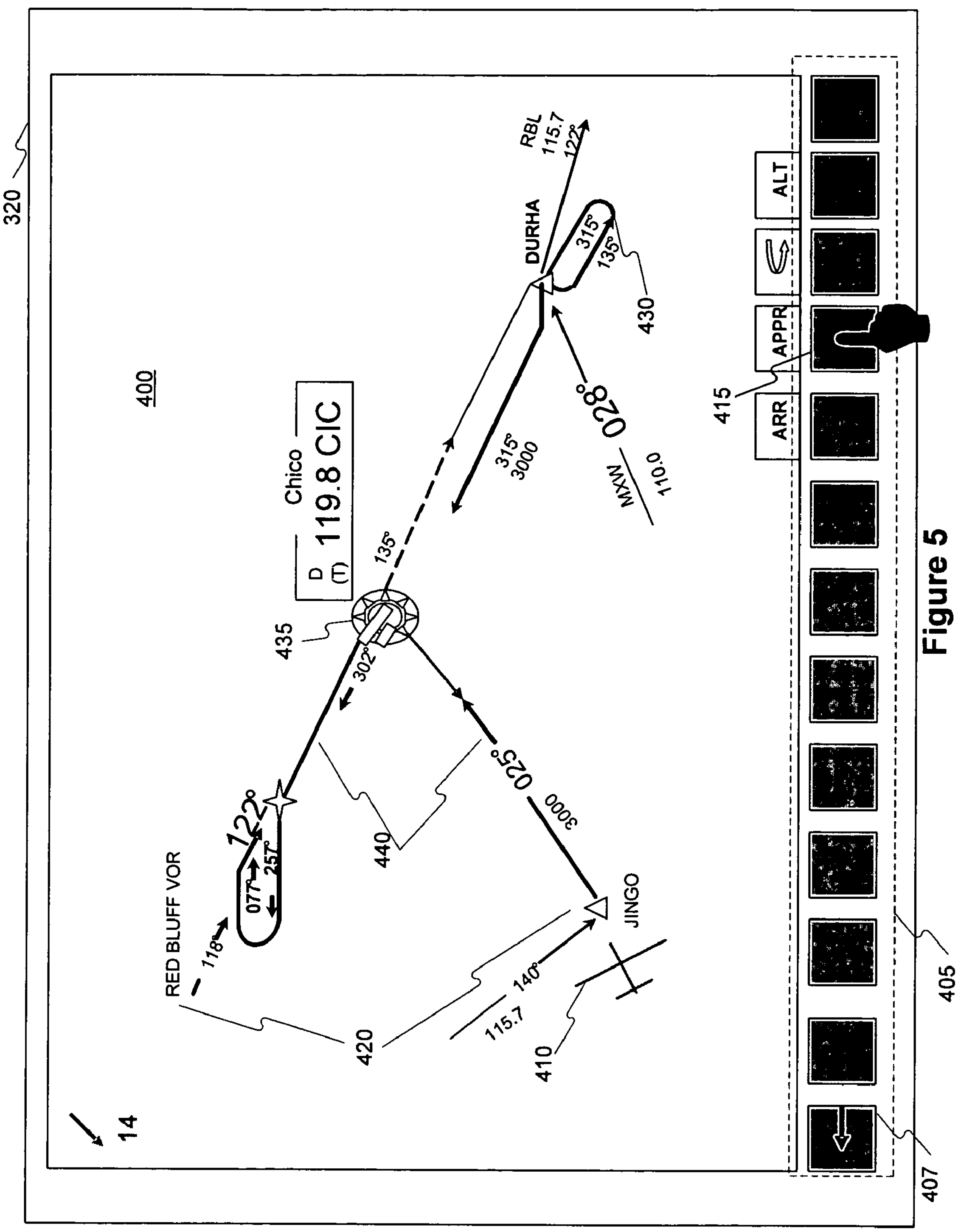
FIG. 5 is an example of information displayed on a MFD related to an approach consistent with one embodiment of the present disclosure.

FIG. 5 is an example of information displayed on a MFD related to an approach, consistent with one embodiment of the present disclosure. MFD 320 may display option selector group 405 which may enable a pilot to select various information or views to be displayed on MFD 320. For example, a pilot may press an option selector causing MFD 320 to display the current aircraft instrument information compiled and summarized for easy analysis. See for example, "Apparatus and Methods for Providing a Flight Display in an Aircraft," U.S. patent application Ser. No. 10/350,124, filed Jan. 24, 2003. Alternatively, a pilot may press an option selector causing MFD 320 to display the aircraft's current navigational information, including, for example, aircraft heading and position as overlaid on navigational charts. When such a display is selected, MFD 320 may present the information display on a moving map 400, as shown in FIG. 5.

Moving map 400 may display navigational aids existing on the navigational chart including, for example, aircraft position indicator 410, waypoints 420, published holding patterns 430, airports (e.g., destination airport) 435, and airways or radials 440. One of skill in the art will recognize that any of the displayed navigational aids (i.e., airports, waypoints, etc.) may be enabled as touch sensitive or clickable areas accessible via a pointer device (e.g., computer mouse or joystick). Accessing any of the navigational aids may, for example, cause additional information regarding that reference to be displayed on MFD 320 or may enable a pilot to specifically select the reference as the object of an operation (e.g., selecting an airport for an approach).

Alternatively, MFD 320 may display navigational information as text with direction and distance information indicated for the surrounding reference points. A pilot monitoring MFD 320 may rescale the display of moving map 400 using option selectors within option selector group 405, thereby revealing more or less detail on moving map 400. A pilot may also scroll or otherwise manipulate the view of moving map 400 using option selectors within option selector group 405 or other input options.

One skilled in the art will further recognize that option selectors within option selector group 405 may change based on previous option selections made by a pilot. Because individual option selectors within option selector group 405 are referenced throughout this discussion, note that where an individual option selector serves a particular purpose in regard to one figure, that same option selector may serve a different purpose in regard to another figure. To aid in comprehension of this feature, an individual option selector will be renumbered on different figures as necessary to indicate a change in purpose for each option selector. Option selectors not referenced during discussion of a particular figure will continue to be referenced using option selector group 405.

One skilled in the art will also recognize that option selectors may be embodied as, for example, touch sensitive hotspots on MFD 320, buttons linked to input device 315 (e.g., a keypad), and clickable areas within MFD display 320 accessible via a pointer device attached to input device 315. Option selector group 405 may also include more or fewer options than those displayed on MFD 320.

As noted, aircraft position may be represented on moving map 400 by aircraft position indicator 410. Aircraft position indicator 410 may enable a pilot to quickly view the aircraft's current position and heading relative to published navigational aids including, for example, airways, airports, and waypoints. A pilot may use aircraft position indicator 410 to quickly determine required flight path changes in order to comply with instructions from ATC. For example, when a heading change is communicated by ATC, a pilot may make the changes using standard controls and instruments, then verify the new flight path by viewing aircraft position indicator 410 relative to navigational aids on moving map 400.

Consistent with the present disclosure, option selectors within option selector group 405 may enable a pilot to perform various functions with MFD 320. Approach option selector 415 is one such function consistent with an embodiment of the present disclosure. In one embodiment, MFD 320 may display approach option selector 415 only while displaying current navigational information. Alternatively, approach option selector 415 may be displayed at all times on MFD 320, or additional option selections may be required prior to approach option selector 415 being displayed. For example, option selector group 405 may also provide options for "arrival functions," "departure functions," and/or "holding pattern functions."

A pilot preparing for an airport approach may access and actuate approach option selector 415. Upon actuating approach option selector 415, the selection may be transmitted to computer 205 which may then enter a mode ("Approach" mode) for accepting further data related to calculations for navigating and flying an approach.

Alternatively, a pilot may speak instructions for entering approach mode to computer 205 through optional interface 330 or other suitable means, so that instructions are translated to computer commands via voice recognition software (e.g., "Dragon Naturally Speaking" software or similar software). In such an embodiment, a pilot may speak commands causing computer 205 to enter "Approach" mode and MFD 320 to display information accordingly. Audio commands may also be received by computer 205 directly from ATC via optional interface 330, or other suitable means, linked to the aircraft's communication system. For example, when specific approach information is issued by ATC, voice recognition software may interpret the term "approach" and cause computer 205 to enter "Approach" mode causing MFD 320 to display approach related information and options.

In yet another embodiment, where data related to an approach is received in a form generally receivable by an aircraft computer (e.g., digital data) or as analog data (e.g., sound information) and subsequently converted to data generally receivable by an aircraft computer, the data may be provided to the aircraft computer without pilot interaction. ATC may transmit such data via systems including, for example, radio, datalink, satellite, or other delivery systems. Upon receiving such data, computer 205 may perform actions such as selection of "Approach" mode and subsequent data entry. Such an embodiment may require minimal pilot interaction (e.g., data entry) although a pilot may override selections made by computer 205 using similar methods to those discussed above (e.g., using return option selector 407 or a cancel selector (not shown)).

Figure 6:
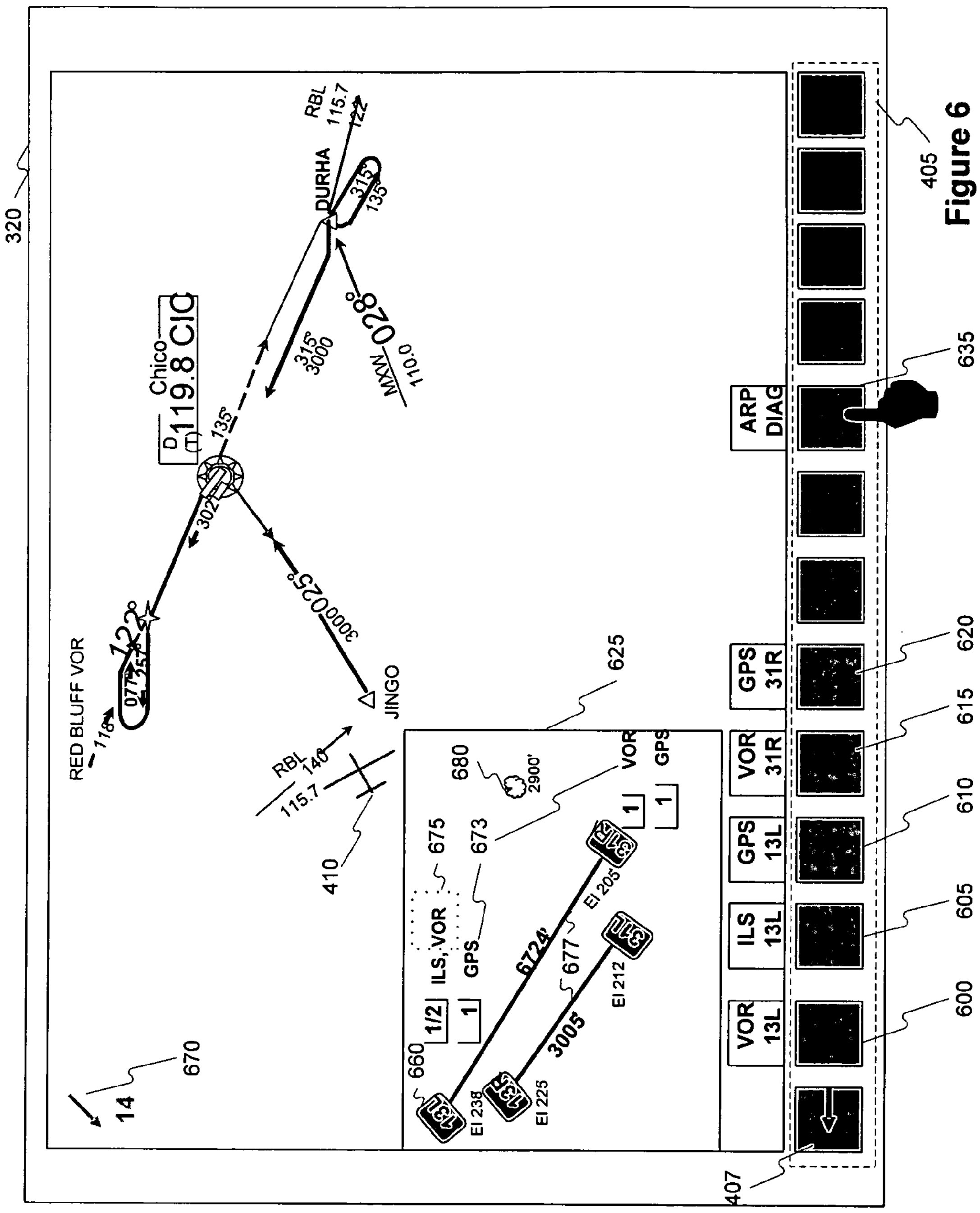
FIG. 6 is an exemplary illustration of a MFD following selection of "Approach" mode consistent with one embodiment of the present disclosure.

FIG. 6 is an example of a MFD display following selection of "Approach" mode consistent with an embodiment of the present disclosure. Because a flight plan may have been pre-programmed into computer 205 prior to departure, or a new destination airport selected at some point during flight, computer 205 may be aware of current destination airport 435. Therefore, upon entering "Approach" mode, via option selector 415, vocal/audio commands, or datalink commands, computer 205 may determine proximity to the previously specified destination airport and nearby waypoints. In one embodiment, computer 205 may verify that the aircraft is properly located for an approach to the previously specified destination airport. Where the aircraft location appears to be incorrect, computer 205 may cause a warning to be displayed on MFD 320 indicating such information. The pilot may then make a determination as to the correctness of the selection and possibly actuate return option selector 407, indicating a return to "Normal" mode. Alternatively, a pilot may not have pre-programmed a flight plan, and computer 205 may present information based on surrounding airports, terrain conditions, weather conditions, etc. Such functionality may assist a pilot in landing at an unplanned location.

Computer 205 may cause MFD 320 to display information related to destination airport 435 within destination airport diagram 625. Such information may be similar to information found on an approach plate within an airport diagram section and may include, for example, runways, runway equipment, and minimum visibilities. For example, MFD 320 may continue to display aircraft position indicator 410 on moving map 400, along with an overlay which may resemble the approach plan section of the related approach plate. Destination airport diagram 625 may also be displayed within MFD 320 and may enable pilot selection of a runway/approach combination. Destination airport diagram 625 may also display runways 677 and runway equipment indicators 673, which may also be touch sensitive hot-spots allowing selection of the runway/approach combination. Destination airport diagram 625 and selection of a runway/approach combination will be discussed in greater detail with reference to FIG. 7.

Weather information, including, for example, wind indicator 670 and ceiling indicator 680, may also be displayed on MFD 320. Wind indicator 670 may display wind information for destination airport 435, including, for example, velocity and/or direction. For example, where wind is steady out of the NE at 14 knots, wind indicator 670 may display this information as illustrated. Wind direction may be provided in the form of an arrow, a text representation of cardinal direction (e.g., NW), or other suitable manner. Additionally, ceiling indicator 680 may display the current altitude for cloud cover. For example, where the cloud cover ceiling at destination airport 435 is 2900 feet, ceiling indicator 680 may display the information as illustrated. Additionally, visibility indicators (not shown) may display the current visibility for the indicated runways. For example, where the visibility for runway 31R is 1 mile, a visibility indicator (not shown) may display the information. Such weather information may be obtained from weather broadcasting services (e.g., ATIS, AWOS, or similar service), weather datalink (e.g., XM, WSI, or other similar service), the airport control tower, or other weather providing entity.

Option selectors within option selector group 405 may also be assigned available runway/approach combinations for each runway at destination airport 435. For example, destination airport 435 may be the airport named "Chico," which may have two runways and several approach options for each runway. Option selectors 600, 605, 610, 615, and 620 may each be assigned an available runway/approach combination. In addition, each runway equipment indicators 673 may be touch sensitive hotspots for selecting a combination. In the present example, option selector 600 or hotspot selector 675 may enable selection of a VOR approach on runway 13L. In addition option selector 605 may enable selection of an ILS approach on runway 13L, option selector 620 may enable selection of a GPS approach on runway 31R, and so forth. Where additional runway/approach combinations are available, such combinations may also be assigned to additional option selectors within option selector group 405. Where the number of combinations exceeds the number of displayable option selectors in option selector group 405, a pilot may be enabled to scroll the option selectors by actuating an option selector indicating additional combinations are available for selection (e.g., "more options"). In addition, runway/approach combinations displayed on MFD 320 may also be selectable as touch sensitive areas or by clicking with an appropriate pointer device (e.g., computer mouse or joystick) within destination airport diagram 625. For example, a pilot may use a pointer device to click hotspot selector 675 to indicate a preference for the VOR approach on runway 13L.

Generally, a pilot may request clearance for any available runway/approach combination from ATC. The pilot may consider factors including, for example, wind velocity, which may be indicated by wind indicator 670, current heading, preferred approach method, taxiways, and available amenities, among other things. In making such a decision, a pilot may desire more information than is available within destination airport diagram 625. Therefore, option selector group 405 may contain a detailed airport diagram selector 635, which may enable a pilot to gain a more detailed view of airport facilities. Alternatively, a pilot may make a selection without viewing a more detailed airport diagram.

Figure 7:
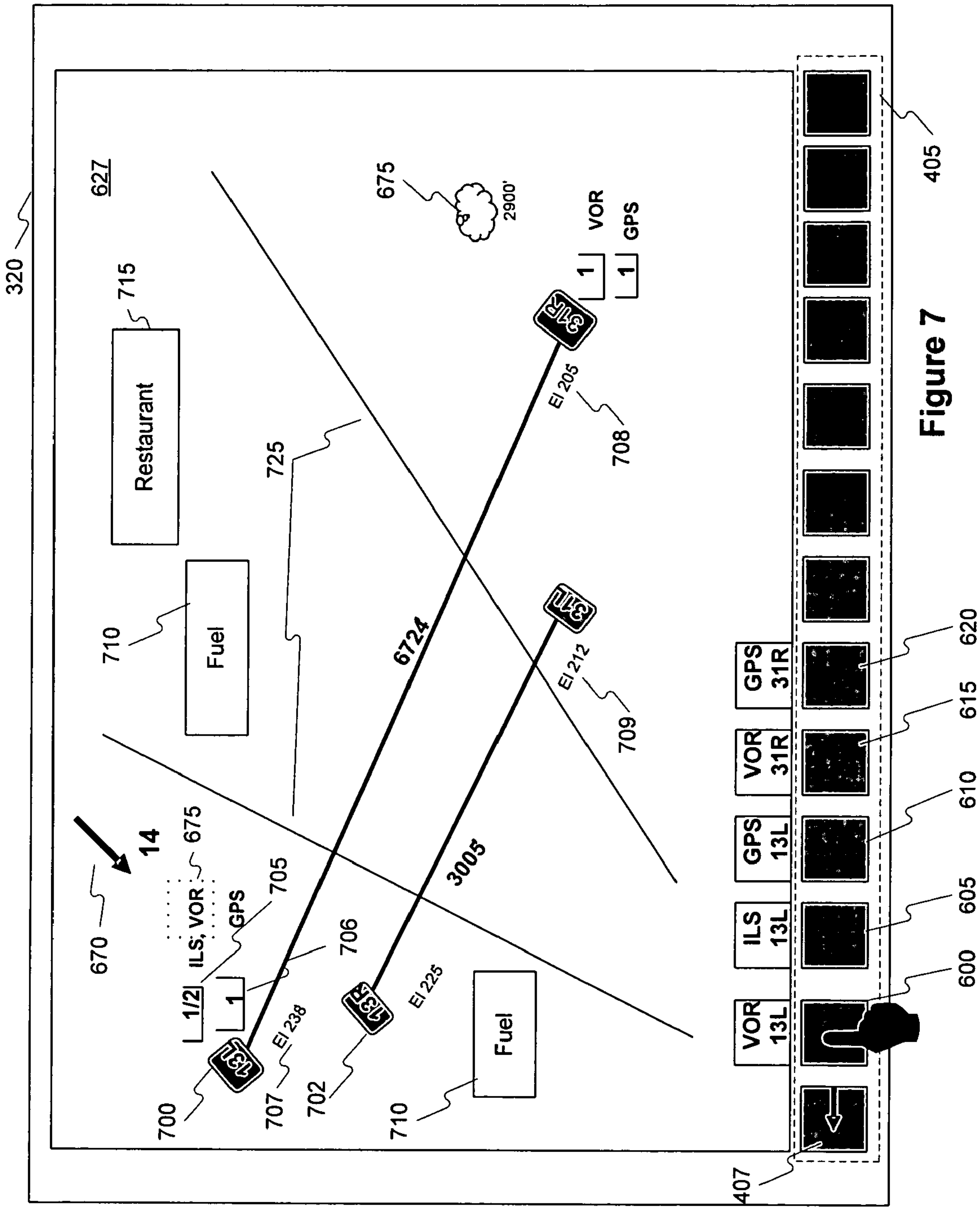
FIG. 7 is an exemplary illustration of a MFD following selection of a detailed airport diagram selector consistent with one embodiment of the present disclosure.

FIG. 7 is an exemplary illustration of a MFD upon actuation of detailed airport diagram selector 635 consistent with one embodiment of the present disclosure. Detailed destination airport diagram 627 may display a destination airport layout in greater detail than that available in destination airport display 625 with information similar to that found on the airport section of an approach plate. A pilot may access detailed destination airport diagram 627 to facilitate a decision as to runway/approach method. For example, detailed destination airport diagram 627 may display a larger more detailed view with runways 700-702, visibility minimums 705-706, touch-down elevations 707-709, fueling stations 710, amenities (e.g., restaurant 715), taxiways 725, and lodging facilities (not shown), among other things. Further multiple layers of detail may be displayed on MFD 320 and each layer may be selectable for display by the pilot. For example, restaurant 715 may be included on a layer entitled "Amenities" while fuel stations 710 may be included on a layer entitled "Fuel." In addition, other facilities may also be depicted (e.g., fixed base operations (FBO), etc.) Each of these layers may be assigned an option selector within option selector group 405. Upon selection of a related option selector, a layer may be displayed or may become invisible based on the state of the layer prior to actuation of the related option selector within option selector group 405. One of skill in the art will recognize that the layers of detail and titles described herein are exemplary only. Many other layers may be added or subtracted and titles changed without departing from the scope of the present disclosure.

In addition, each of the amenities (e.g., fuel, FBO, restaurants, etc.) or other elements represented on MFD 320 may be selectable hotspots and/or may be assigned option selectors in option selector group 405. For example, fuel station 710 may also be a hotspot on MFD 320 and assigned an option selector (not shown) in option selector group 405. Upon actuating or accessing an amenities related hotspot or option selector, additional information related to the accessed amenity may be displayed. For example, accessing fuel station 710 may cause information including price of fuel, grade of fuel, availability of fuel, and fueling practices to be displayed on MFD 320. In another example, accessing an FBO hotspot may cause information including additional fuel information, available repair facilities, hangar space information, and other types of related information to be displayed on MFD 320. Accessing a restaurant hotspot or option selector may cause menu and cuisine information, among other things, to be displayed on MFD 320. Amenities related information may be made available to computer 205 via compact disk, datalink, or other suitable method. One of skill in the art will recognize that many types of amenities and amenity related information may be displayed on MFD 320 and many other methods of providing such information to computer 205 may be used without departing from the scope of this disclosure.

Once a pilot has determined and been cleared by ATC for a runway/approach combination, the pilot may select the runway/approach from combination option selectors 600-620. Alternatively, as noted above, the pilot may make a selection of the runway/approach by actuating a related touch sensitive element on MFD 320. For example, a pilot may determine that the approach and landing should be made using runway 13L and a VOR approach. Such a combination may correspond to both option selector 600 and hotspot selector 675. In order to select the combination as desired, pilot may actuate option selector 600 or may select hotspot selector 675 directly on moving map 400 using any method of selection available for MFD 320 (e.g., a computer mouse, joystick, or touchscreen).

Alternatively, where computer 205 is configured to receive spoken commands via voice recognition software, the pilot may speak the identifier of the specified combination as a means for selecting the desired runway/approach combination. In such an embodiment, voice recognition software may translate the spoken command and effect selection of the spoken runway/approach combination by computer 205. Further, where computer 205 is enabled to receive ATC commands directly via audio, computer 205 in combination with voice recognition software may receive and select the specified runway/combination based on the clearance issued by ATC. For example, an ATC clearance may indicate clearance for the VOR 13L approach on runway 700 at destination airport 435, and computer 205 may automatically select the appropriate runway/approach combination with no pilot action. Alternatively, computer 205 may receive and process the ATC clearance by datalink (e.g., ADS-B).

In another embodiment consistent with the present disclosure, computer 205 may provide guidance for selection of a runway/approach combination. Computer 205 may consider similar factors to those considered by a pilot and/or may perform additional calculations to determine factors of safety, among other things. For example, computer 205 may determine that based on wind speed and current heading, a landing on runway 13L at destination airport 435 with a VOR approach is the preferred combination. Computer 205 may cause option selector 600 to be highlighted or may default the selection to the determined runway/approach combination. In such an embodiment, a pilot may override the default selection by computer 205 or may acquiesce to the computer's selection. Further, the pilot may view detailed destination airport diagram 627 to confirm computer selection or may determine that computer 205 is correct without further review.

Figure 8:
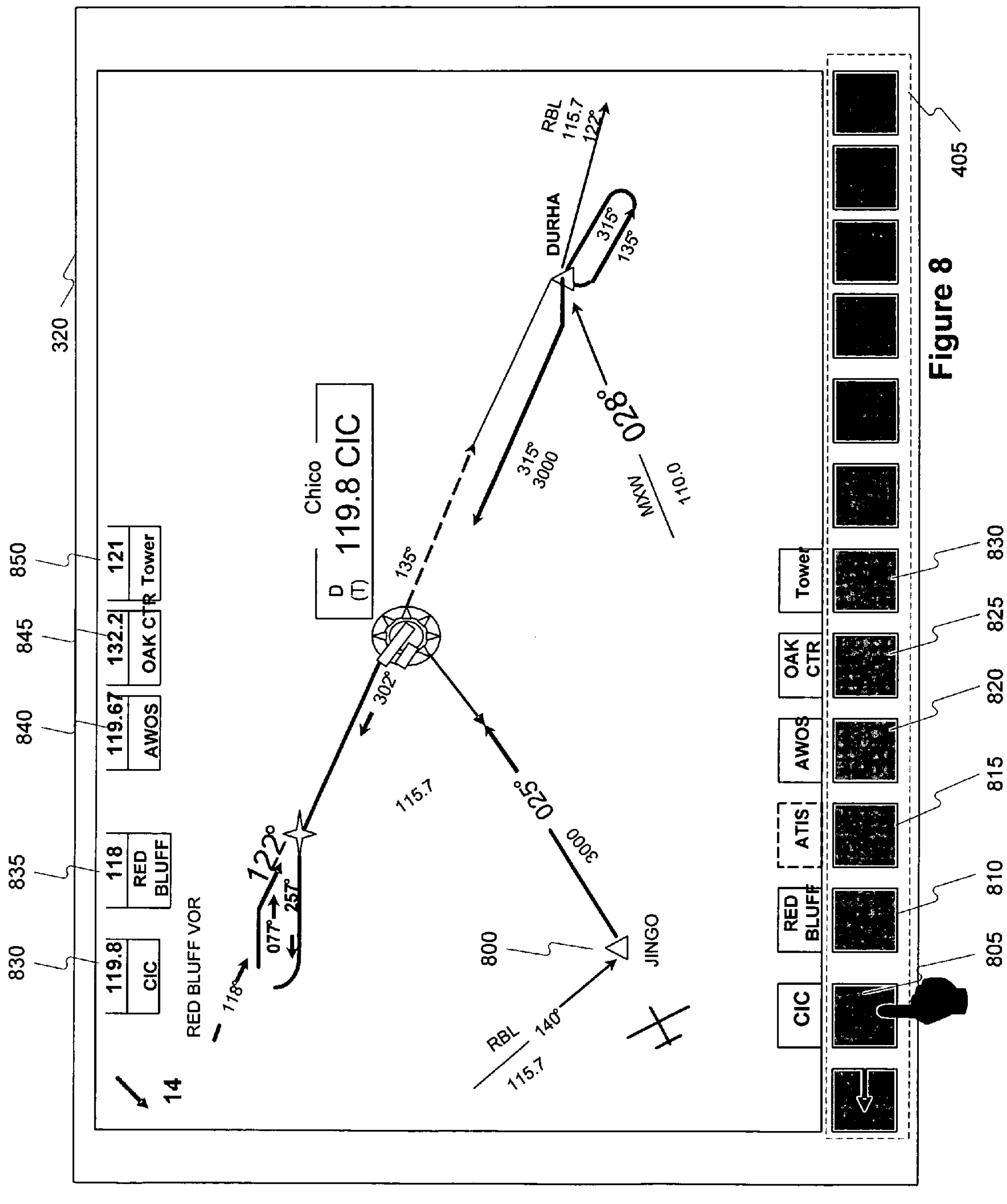
FIG. 8 is an exemplary illustration of a MFD following selection of a runway/approach combination consistent with one embodiment of the present disclosure.

FIG. 8 is an exemplary illustration of a MFD following selection of a runway/approach combination consistent with one embodiment of the present disclosure. Following clearance and runway/approach selection, computer 205 may compare previously entered flight plan information to information related to the selected approach to confirm the selected approach is appropriate based on the flight plan. Where computer 205 determines that a discrepancy may exist between the previously entered flight plan and the selected approach (e.g., wrong airport, wrong approach, etc.), computer 205 may warn the pilot via a message on MFD 320 or other suitable method, and may allow the pilot to take corrective action (e.g., using return option selector 407 or a cancel selector (not shown)). Where computer 205 determines that the selected approach information and flight plan concur, computer 205 may cause MFD 320 to revert navigation display on moving map 400 to enable the pilot to navigate the aircraft according to the approach vectors related to destination airport 435. An overlay resembling an approach plan view from the related approach plate may also be provided on moving map 400, or, alternatively, the pilot may have the option to not display the approach plan view. For example, following the selection of VOR 13L approach at Chico airport, Jingo waypoint 800 may be an initial navigation fix, and the pilot may utilize moving map 400 and provided navigation information to navigate to Jingo waypoint 800. Alternatively, the pilot may use standard instrumentation and navigation techniques to navigate to Jingo waypoint 800.

Computer 205 may also cause navigation or communication radio frequencies for navigation aids and or control entities, respectively, near destination airport 435 to be displayed on MFD 320 with option selectors assigned to each frequency within option selector group 405. For example, on approach to destination airport 435 (e.g., Chico airport, i.e., KCIC), navigation aids related to destination airport 435 (e.g., Chico VOR, i.e., CIC) and surrounding navigational aids (e.g., Red Bluff VOR), and surrounding control entities (e.g., ATIS or AWOS for KCIC) may be available. In addition, communication frequencies for surrounding communication facilities (e.g., Oak Center and Chico Control Tower) maybe available. In such an embodiment, the frequency for CIC may be assigned to navigation frequency selector 805, the frequency for Red Bluff VOR may be assigned to navigation frequency selector 810, and so on. Further, the communication frequency for Oak Center may be assigned to communication option selector 825 and the communication frequency for Chico Tower may be assigned to communication option selector 830. Upon actuation of a navigation frequency selector, computer 205 may cause navigation radios to be tuned to the appropriate frequency. In one embodiment, where multiple navigation or communication radios are present, each radio may be tuned sequentially. In another embodiment, a pilot may have the ability to select which navigation or communication radio may be tuned to the selected frequency via an option selector within option selector group 405 or other suitable selection option. In addition, where a particular navigation aid may normally be present, but is not currently available (e.g., malfunctioning, removed, etc.), computer 205 may cause the associated option selector to be inoperable. For example, ATIS selector 815 appears with a dotted line indicating that the frequency and/or navigational aid may not be available.

Each available frequency may also be seen at frequency displays 830-850. Frequency displays 830-850 may also be touch sensitive hotspots or may be clickable areas, enabling additional methods of selection. Utilizing this aspect of the present disclosure, a pilot may be saved the difficulty of finding a particular frequency on an approach chart, as all of the available frequencies may be displayed on MFD 320. One of skill in the art will recognize that more or fewer items may be displayed and that other methods for tuning of navigational and communication devices may be used without departing from the scope of the present disclosure.

In another embodiment, computer 205 may cause navigation and communication devices to be tuned automatically based on various factors such as aircraft position, signal strength (from the navigational aid), weather, and so forth. For example, an aircraft on approach to destination airport 435 may have several navigation aids and communication options to choose from. Computer 205 may determine based on signal strength and aircraft position that frequency 830 (i.e., option selector 805) may be selected. Computer 205 may therefore automatically tune a related navigation radio to the appropriate frequency, in this case CIC 119.8. Computer 205 may then verify the Morse code identifier emitted on CIC 119.8 to ensure the proper frequency has been contacted. If computer 205 cannot verify the Morse code identifier, a warning indicator may be used.

Figure 9:
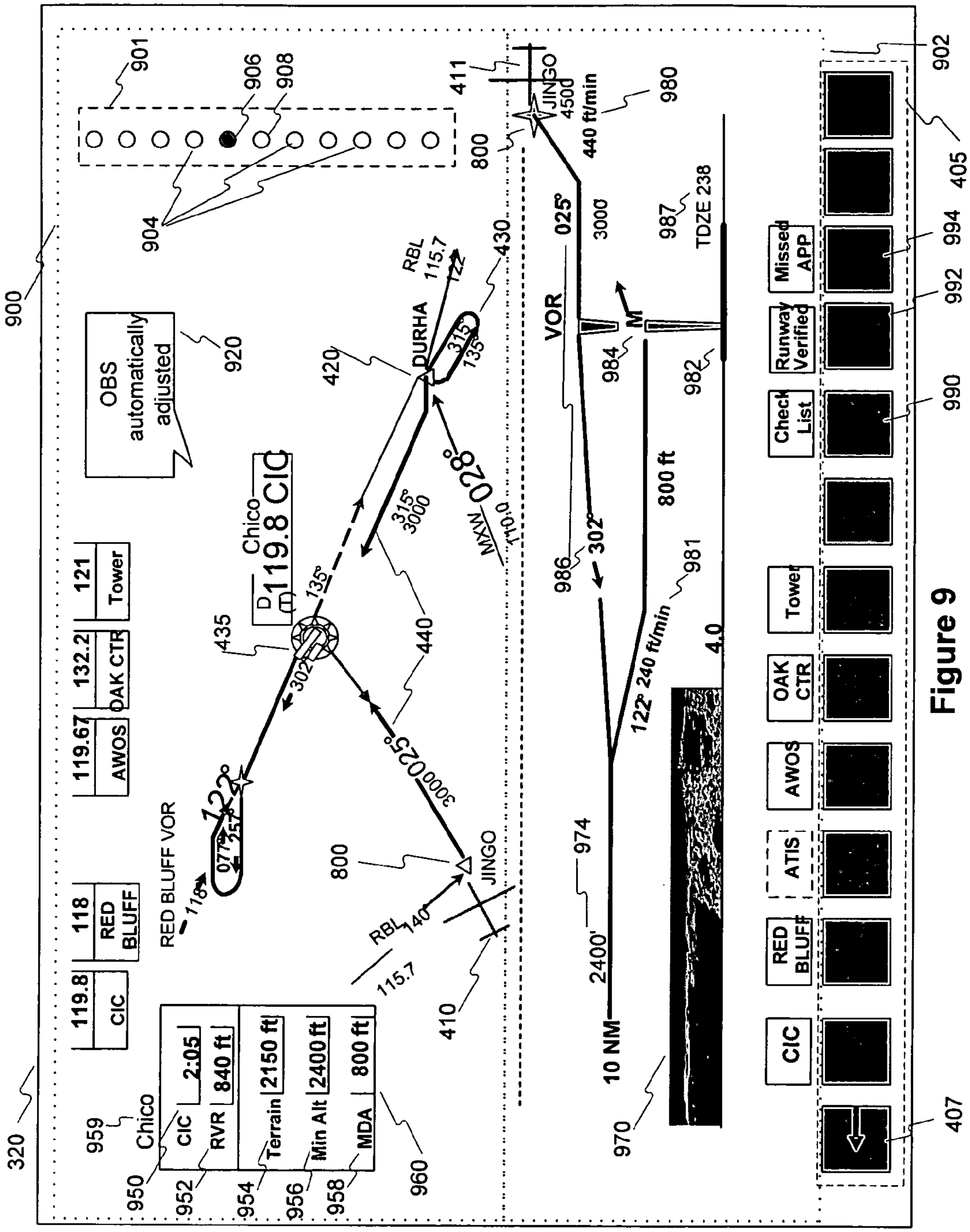
FIG. 9 is an exemplary illustration of a MFD following tuning of navigation and communication radios consistent with one embodiment of the present disclosure.

FIG. 9 is an exemplary illustration of MFD 320 following tuning of navigation and communication devices consistent with one embodiment of the present disclosure. It will be understood that the contents of MFD 320 will be discussed with reference to FIG. 9, while the remaining figures may demonstrate exemplary functionality of the contents discussed. MFD 320 may contain more or fewer elements than described without departing from the scope of the present disclosure.

Once a pilot has selected an approach and made selections for navigational frequencies, MFD 320 may be separated into multiple sections similar to a paper approach plate. Sections may include, for example, lateral display section 900, which may resemble the approach plan section of the related approach plate; information window 960, which may resemble the minimums section of the related approach plate; and vertical display section 902, which may resemble the profile section of the related approach plate. Each section may display both dynamic real-time information (e.g., aircraft position and velocity) and information related to the specified approach procedures for the selected runway/approach combination (e.g., specified navigation and altitude requirements). Such information may include navigation information for the selected approach/runway combination, communication frequencies (to allow re-tuning of the radios), safety information and any other suitable information.

Lateral display section 900 may correspond to the approach plan view on the related approach plate, and may be displayed on moving map 400. As described above, such information may be displayed via an overlay or other method such that a pilot may activate or deactivate the information as desired. Information within lateral section 900 may include, aircraft position (e.g., aircraft position indicator 410), cardinal direction (e.g., east, west, etc.) (not shown), waypoints 420, published holding patterns 430, airports (e.g., destination airport) 435, bearing or radial information 440, and lateral guidance display 901, among other things.

In one embodiment consistent with the present disclosure, lateral guidance display 901 may be aligned vertically within MFD 320 and may display lateral guidance indicators 904, which may include a series of areas, each area indicating a fixed amount of deviation from a desired approach course. Alternatively, lateral guidance display may be aligned horizontally within MFD 320. Further, on-course indicator 908 of lateral guidance display 901 may indicate the aircraft is on the specified approach course or radial. Lateral guidance indicators 904 may be lights, LEDs, graphics, or any other suitable indicator and may become highlighted based on a determination of the aircrafts current heading, among other things. For example, lateral guidance indicators may be arranged in 2.5 degrees increments within lateral guidance display 901. Lateral guidance display 901 may assist a pilot in correcting aircraft heading to comply with specified approach procedures. An aircraft desiring a course on the 205 radial of Chico (i.e., a 025 degree heading), but currently flying a course of 22.5 degrees may expect to see course deviation indicator 906 highlighted as shown in FIG. 9, or displayed in another suitable fashion. In another example, a pilot may be instructed to utilize an initial approach fix of Jingo waypoint 800. Based on the aircraft's current position and velocity, computer 205 may cause course deviation indicator 906 to become highlighted indicating a specific course deviation from the desired course to Jingo waypoint 800. It is important to note that the alignment and increments of lateral guidance display and lateral guidance indicators is exemplary only and any suitable arrangement may be used. For example, where an aircraft has deviated beyond the scale represented, lateral guidance display 901 may recalibrate lateral guidance indicators 904.

Information window 960 may correspond to the minimums section of the related approach plate, but may also include additional real-time dynamic data. Information window 960 may display data including, for example, timers, runway visual range (RVR), minimum descent altitude (MDA), and terrain altitude, among other things. For example, timer display 950 may indicate particular estimated times including, the current estimated time of arrival to an initial airport flyover, time to procedure turn, time to missed approach point, time to final approach fix, and so forth. In one embodiment, during an approach where the VOR is located at the airport facility (i.e., on-airport VOR), a pilot may navigate to the VOR station located at the airport. Following airport flyover, the pilot may navigate on a radial away from the airport performing a procedure turn before proceeding with the final approach. In such an embodiment, timer 950 may inform the pilot of the amount of time until the airport is reached, the time to the procedure turn, time to the final approach fix, and time to a missed approach point. Such information may be calculated by computer 205 based on velocity and aircraft position, and/or may be determined via DME, or other measuring equipment. For example, where an aircraft is flying an initial approach from waypoint 800 (e.g., Jingo) to destination airport 435 (e.g., Chico (KCIC)) via the on-airport VOR (e.g., CIC), timer 950 may indicate arrival at the VOR station of CIC in two minutes and five seconds. Computer 205 may calculate this time based on distance to CIC and aircraft velocity, or, alternatively, may use DME or other appropriate equipment and methods. Additional examples of timer 950 display will be discussed in greater detail below.

Runway visibility range may also be provided within lateral display section 900. Runway visibility range may indicate the minimum length of runway a pilot must see before being permitted to land on a particular runway at destination airport 435 using the selected approach. This information is typically specified by the aviation regulating authority and may be found on the appropriate approach plate for the airport/runway. For example, RVR display 952 may indicate an RVR of 840 feet for a VOR approach at destination airport 435. Based on this information, a pilot may determine that on the approach that at least 840 feet of runway is visible and landing may be allowed. Alternatively, where a pilot determines that less than 840 feet of runway is visible, landing may not be permitted and the pilot may execute missed approach procedures.

Terrain altitude, minimum altitude, and minimum descent altitude (MDA) may also be displayed within information window 960. Terrain altitude display 954 may indicate the maximum altitude of terrain surrounding the currently selected runway (e.g., within a certain radius of the runway). The combination with minimum altitude display 956 and vertical terrain display 970, which will be discussed in greater detail below, but a pilot may use these features to determine whether a safe altitude is being maintained and/or whether landing may be possible. For example, terrain altitude display 954 may indicate that the maximum altitude to which surrounding terrain extends is 2150 feet. Minimum altitude display 956 may indicate a minimum altitude as determined by the aviation regulating authority, in this example 2400 feet. Therefore, a pilot may maintain an altitude of no less than 2400 feet and remain reasonably certain that terrain collision should not occur. This may be further confirmed utilizing vertical terrain display 970 as discussed in greater detail below.

During a non-precision approach, minimum descent altitude display 958 may be present within information window 960 and may display the minimum altitude to which a pilot may descend on final approach to the airport. Alternatively, decision height display (not shown) may be displayed during precision approaches. During a non-precision approach, a pilot may not descend below the MDA unless and until the runway and RVR are visually verified. MDAs may be determined by the aviation regulating authority and may be provided as approach information on an approach plate. There may also be civil penalties for violating the MDA and RVR. Therefore, it is important for a pilot to be aware of the MDA and RVR before and during and approach. Should a pilot descend below MDA on approach, computer 205 may cause display on MFD 320 to warn the pilot of the situation. This may be done by highlighting, flashing or by any other suitable method. For example, a final approach to destination airport 435 may have an MDA of 800 feet specified. Therefore, a pilot may not descend below 800 feet unless the runway and RVR are visible. Where electronic glideslope information is available (e.g., ILS approach), DH may be displayed in place of MDA. Computer 205 may warn pilot when the DH is passed as a reminder that a decision to land must be made.

Vertical display section 902 may correspond to the profile section of the related approach plate, but may also include additional real-time, dynamic information. Vertical display section 902 may display information related to an aircraft's position relative to approach related information. Vertical display section 902 may include, for example, a glideslope (not shown), glideslope intercept point (not shown), terrain display 970, calculated descent rates 980-981, runway 982, missed approach point (MAP) 984, vertical position indicator 411, and a vertical guidance display (not shown). Such information may be customized by a pilot using options available from MFD 320.

Glideslope information is typically provided only for a precision approach (e.g., runways with ILS equipment). A glideslope typically gives a 3 degree approach to a runway, which may indicate a descent rate of about 300 feet per nautical mile. This may give a reasonable rate of descent for most aircraft, e.g. 600 feet per minute at 120 knots groundspeed and 450 feet per minute at 90 knots groundspeed. The approximate number of feet above the ground for the glideslope at any given point can be approximated by multiplying the distance from the runway in nautical miles by 300. During an ILS approach, computer 205 may simulate a glideslope for calculating an aircraft's position relative to the glideslope and for comparison to electronic glideslope information received. Computer 205 may perform calculations related to the glideslope while displaying the aircraft's position relative to the glideslope within vertical display section 902. In so doing, computer 205 can confirm that the glideslope information is reliable.

In another embodiment, a generated glideslope may also be calculated by computer 205 during approaches for which no electronic glideslope information is available (e.g., non-precision approaches). Therefore, information obtained from an approach plate associated with a particular runway/approach combination may be used when generating such a glideslope, but computer 205 may also calculate descent rates for an aircraft based on prescribed, non-precision approach procedures. In such an embodiment, computer 205 may display the calculated descent rates in combination with a generated glideslope and an aircraft's position relative to the generated glideslope and prescribed approach procedures. For example, within vertical display section 902, an initial descent rate may be displayed followed by a final descent rate, each of which may be calculated based on approach procedures, an aircraft's current velocity, weight, wind speed, and/or other factors. Such calculations may result in a 3 degree glideslope, or, alternatively, may result in the aircraft following the prescribed procedures. Calculated descent rates will be discussed in greater detail below. Alternatively, computer 205 may provide only the calculated descent rates or the generated glideslope information. Real-time aircraft position within vertical display section 902 will also be discussed in greater detail below.

Calculated descent rates 980-981 may display preferred rates of descent for an aircraft based on several factors. Such rates of descent may be calculated by computer 205 to adhere to the prescribed approach procedures while taking into consideration aircraft weight, aircraft velocity, aircraft heading, desired altitude following the descent, distance for the descent, and/or ambient weather, among other things. For example, a VOR approach plate for runway 13L at Chico airport may indicate navigation to Jingo waypoint 800 at 4500 feet on the 205 radial (i.e., 25 degree heading), followed by a descent to 3000 feet on the 205 radial after crossing Jingo waypoint 800. Computer 205 may determine based on the weight of the aircraft, the aircraft's velocity, and the altitude change that a preferred rate of descent may be 440 feet per minute as displayed by calculated descent rate 980. In other words, if the aircraft is flown at a controlled descent rate of 440 feet per minute during the indicated flight segment, the aircraft may remain in compliance with the current approach procedures. In another example, an aircraft on final approach to Chico runway 13L at the specified 2400 foot minimum altitude on the 302 radial (i.e., a heading of 122 degrees) may descend to the MDA (i.e., 800 feet) following completion of a procedure turn. Computer 205 may determine based on safety factors and/or other factors discussed above that a preferred rate of descent may be 240 feet per minute as displayed by calculated descent rate 981. Vertical position indicator 411 may be displayed relative to projections of the preferred descent rates, or other suitable methods for indicating vertical position may be used. One of skill in the art will recognize that many factors (e.g., terrain, distance, weight, etc.) may be utilized for calculating descent rates and numerous other methods of communicating such information to a pilot may be utilized without departing from the scope of this disclosure.

A vertical guidance display (not shown) may be displayed within vertical display section 902, or at another location within MFD 320. The vertical guidance display may appear similar to lateral guidance display 901 and may serve to indicate deviations from and/or compliance with calculated descent rates or glideslope information. Similar to lateral guidance display, vertical guidance display may include a series of areas (e.g., vertical guidance indicators), each area indicating a fixed increment from a preferred descent rate or glideslope. Vertical guidance indicators (not shown) may be lights, LEDs, graphics, or any other suitable indicator and may become highlighted based on a determination of the aircrafts position relative to the calculated descent rate (non-precision approach) and/or glideslope (precision approach). Vertical guidance display may assist a pilot in correcting altitude deviations to remain in compliance with specified approach procedures. For example, vertical guidance indicators may be arranged in 50 feet per minute increments within a vertical guidance display. An aircraft descending at a rate of 500 feet per minute during a VOR approach to runway 13L at Chico on the 205 radial (i.e., heading 25 degrees) may cause vertical guidance display to show a +50 feet per minute deviation from the preferred descent rate. This indication may be rounded up or down based on factors including vertical guidance display scale and pilot preference. A vertical guidance display may be provided for any runway/approach combination (e.g., precision and non-precision), or, alternatively, vertical guidance display may be displayed only for those approaches providing electronic glideslope information (e.g., precision approaches) as desired.

Terrain display 970 may display an image or representation of terrain currently surrounding and/or within the navigation path of the aircraft during approach. Such a display may include digital reproductions of actual photographic images, video, digital representations, LED displays, or other suitable means for indicating vertical height within vertical display section 902. For example, videos or images of mountains surrounding an approach to Chico airport may be displayed as shown in terrain display 970. In such an example, as a pilot navigates an approach course, he may verify a safe altitude using vertical position indicator 411 in combination with terrain display 970. Terrain display 970 may also be displayed within other areas of MFD 320. For example, terrain display 970 may be overlaid in lateral guidance display 901 or in vertical display section 902.

Runway 982 may include a representation of the selected runway within vertical display section 902. Runway 982 may be represented as a raised or highlighted area within vertical display 902 and may coincide with the display of navigational equipment at runway 982 (e.g., VOR, localizer, etc.). In addition, runway 982 may include images similar to those utilized for terrain display 970, to enable a pilot to locate a runway on the ground. Information related to runway 982 may also be displayed within other areas of MFD 320. Runway 982 as well as MAP 984 will be discussed in greater detail with reference to FIGS. 12-15.

Option selector group 405 may also include additional options following selection of a runway/approach and tuning of navigation radios. For example, checklist option selector 990, runway verification selector 992, and missed approach option selector 994 may be displayed on MFD 320. Such options will be discussed in greater detail with reference to FIGS. 14 and 15.

Note that following tuning of navigation radios or as navigational waypoint related events occur (e.g., crossing a waypoint), omni-bearing selector (OBS) adjustments may be carried out by computer 205. In addition, a pilot may be provided a message on MFD 320 indicating that OBS adjustments have been made. For example, upon tuning a navigation radio to the VOR station at Chico, the OBS may be adjusted by computer 205 accordingly. In addition, upon such adjustment, the pilot may receive a message similar to OBS message 920 on MFD 320. Alternatively, such a message may be provided by audio or any other suitable method.

Also note that if, at any point before or during an approach, ATC should communicate instructions to fly a different approach, navigate to a different airport, utilize a different runway, or other unexpected instruction, a pilot may simply restart the navigation and approach sequence using return option selector 407 and/or voice command (where computer 205 is configured for voice recognition). Utilizing return option selector 407 may enable a pilot to step back through the previous selections changing only that information modified by ATC in a communicated instruction. For example, a pilot may have initially been cleared for a VOR approach to runway 13L at Chico. Where ATC subsequently communicates an instruction to make a VOR approach to runway 31R at Chico, a pilot may utilize return option selector 407 to step back through the approach configuration and make any changes as communicated by ATC. Alternatively, computer 205 may affect these changes automatically, if voice recognition or datalink (or similar capability) are used, which may automatically acted upon by computer 205.

Figure 10:
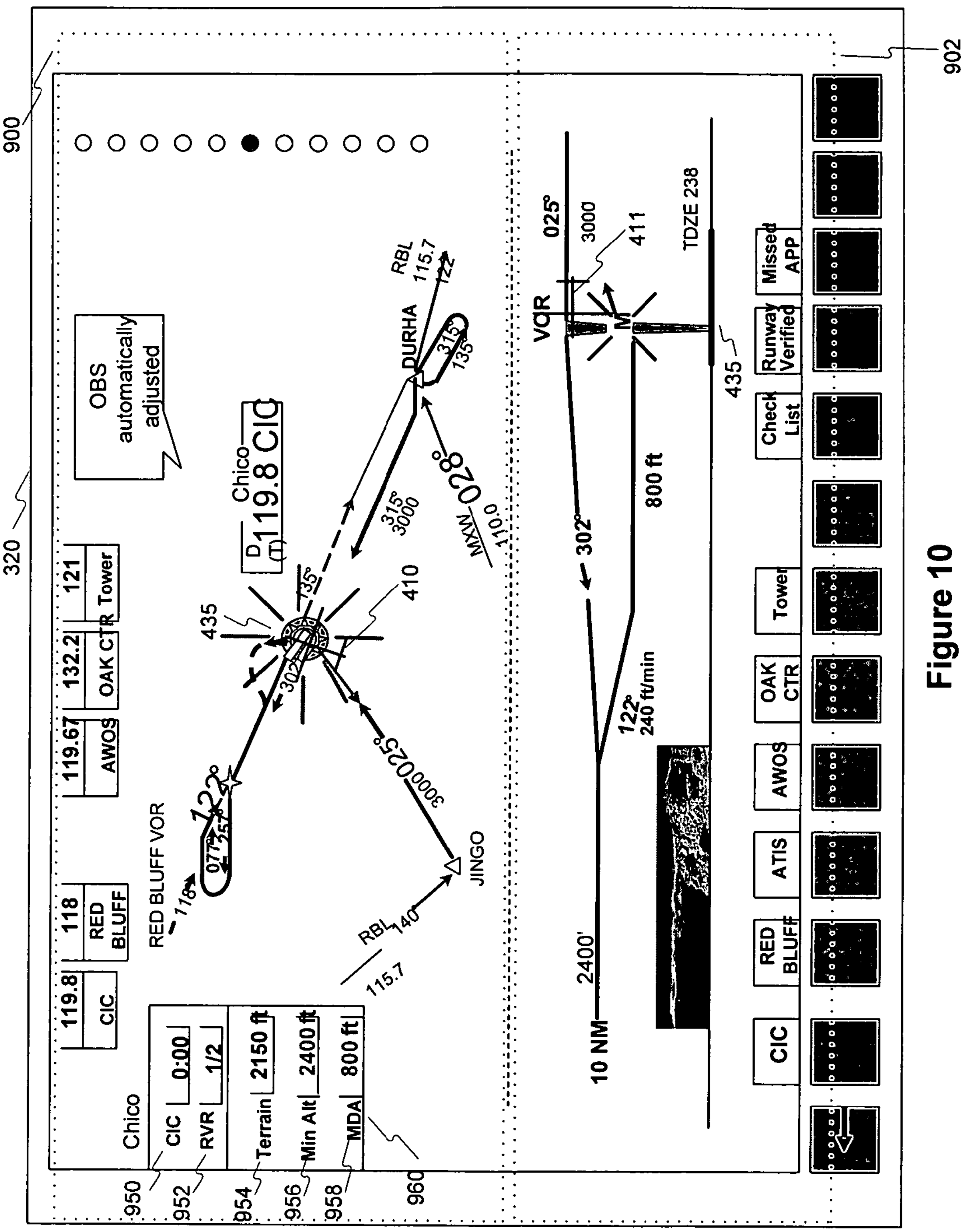
FIG. 10 is an exemplary illustration of a MFD during the approach phase following navigation to and fly-over of an on-airport VOR station consistent with one embodiment of the present disclosure.

FIG. 10 is an exemplary illustration of a MFD during the approach phase following navigation to and fly-over of an on-airport VOR station consistent with one embodiment of the present disclosure. It is important to note that a fly-over of an on-airport VOR station may or may not occur depending on aircraft heading, equipment availability, and approach procedures as promulgated by the aviation regulating authority, among other things. In the present embodiment, as the aircraft successfully flies over the VOR station, computer 205 may cause the representation of destination airport 435 within both lateral display section 900 and vertical display section 902 to become highlighted to alert the pilot that fly-over has occurred. Highlighting may be embodied as flashing, color changes, shading, or other suitable method. Highlighting of destination airport 435 may continue throughout the remaining approach segments to alert pilot that the fly-over has occurred. Alternatively, the highlighting may cease following initiation of a procedure turn or other suitable event.

In addition to highlighting destination airport 435, a pilot may observe the positions of aircraft position indicator 410 and vertical position indicator 411 relative to destination airport 435 and any associated VOR station. Timer 950 may display a time to current waypoint (e.g., destination airport 435) of zero minutes and zero seconds, indicating that the aircraft has reached the current waypoint (i.e., destination airport 435). Computer 205 may also cause the OBS to be adjusted based on the new heading of 122 degrees on radial 302.

Figure 11:
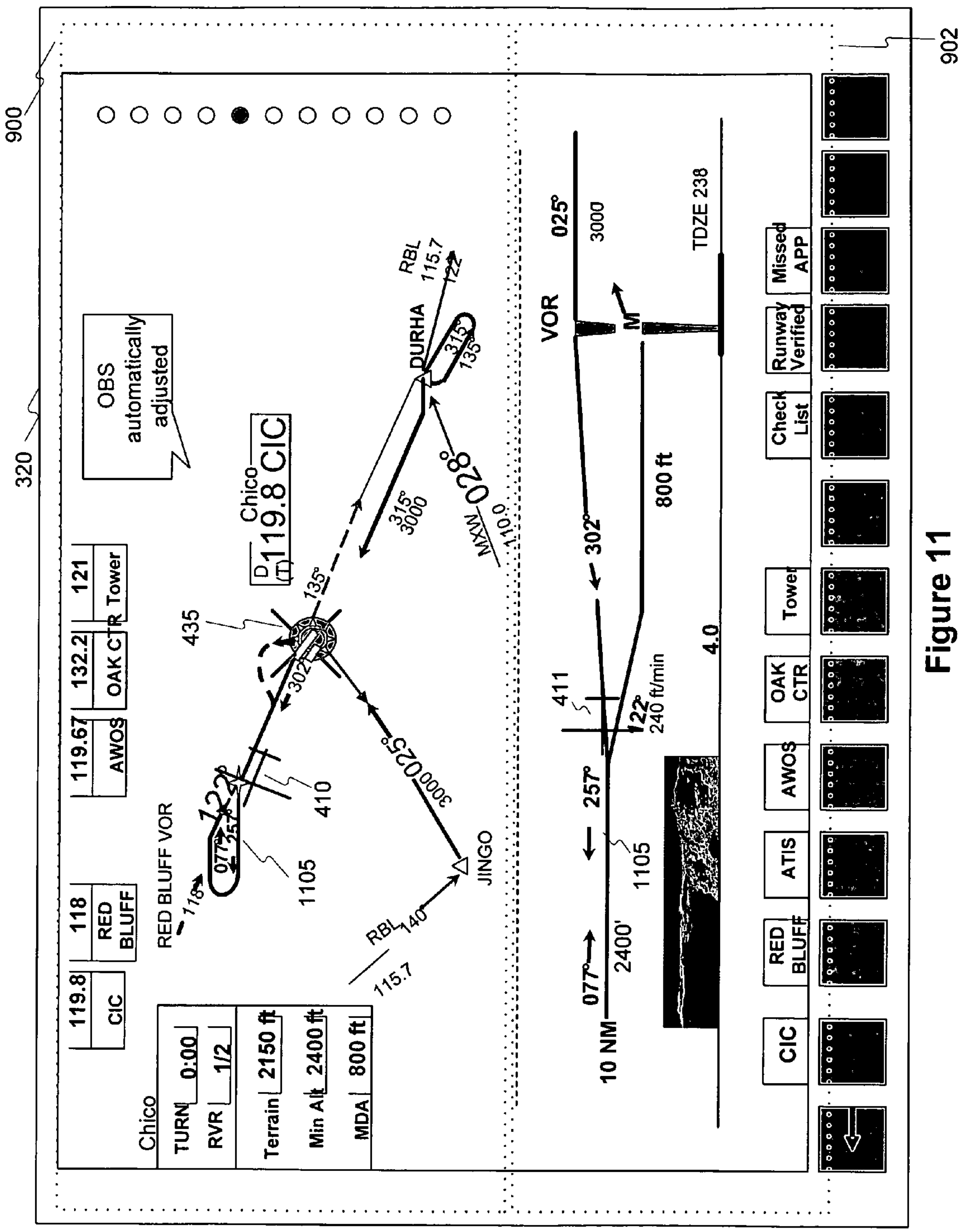
FIG. 11 is an exemplary illustration of a MFD as an aircraft arrives at a procedure turn to begin a final approach, consistent with one embodiment of the present disclosure.

FIG. 11 is an exemplary illustration of a MFD as an aircraft arrives at procedure turn 1105 to begin a final approach to destination airport 435 consistent with one embodiment of the present disclosure. Pilot may view lateral display section 900 to determine that aircraft position indicator 410 shows that the aircraft is nearing the procedure turn. Computer 205 may also cause an alert (e.g., visual or audible cue) to be issued and displayed on MFD 320 indicating the time to initiate procedure turn 1105 has arrived. Timer 950 may indicate that the estimated time to procedure turn 1105 is zero minutes and zero seconds. Computer 205 may also cause the OBS to be adjusted based on the new heading of 257 degrees A pilot may evaluate the procedure turn while viewing lateral display section 900 and vertical display section 902. Further, terrain display 970 and vertical position indicator 411 may assist a pilot in determining aircraft position relative to terrain during a procedure turn. Terrain display 970 may provide information as to the altitude and arrangement of surrounding terrain. In the present example, terrain display 970 indicates high mountains present during the procedure turn and a pilot should be careful to maintain minimum altitude.

Figure 12:
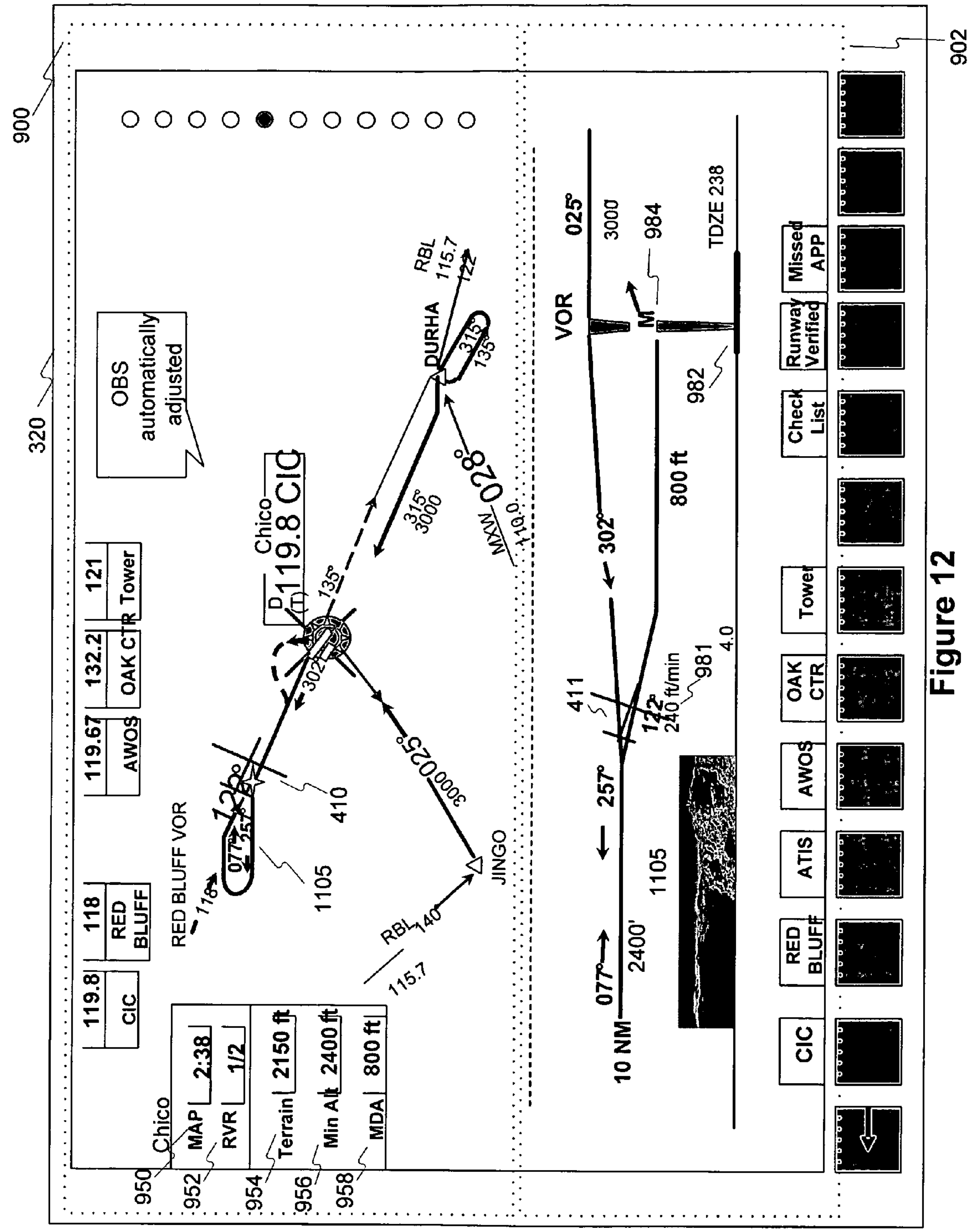
FIG. 12 is an exemplary illustration of a MFD as an aircraft enters the final approach segment of a flight, consistent with one embodiment of the present disclosure.

FIG. 12 is an exemplary illustration of MFD 320 as an aircraft enters the final approach segment of a flight, consistent with one embodiment of the present disclosure. Upon entering the final approach segment, a pilot may monitor lateral display section 900 for compliance with the specified approach procedure and navigation guidance. Also, computer 205 may cause timer 950 to indicate an estimated time to MAP 984. MAP 984 may indicate the point at which a pilot must execute missed approach procedures (as prescribed on the related approach plate) when a required visual reference is not in sight or feels it is unsafe to continue with the approach to the runway. For example, during a non-precision approach from the MDA, a pilot must visually verify runway 982 before reaching MAP 984, or the pilot must execute the missed approach procedures. Alternatively, during a precision approach, a pilot must intercept the glideslope and determine at or before the DH, whether to continue landing procedures. Computer 205 may calculate the estimated time to MAP 984 using aircraft velocity, aircraft position, DME, or any other suitable method.

Further, during the final approach, vertical position indicator 411 may be monitored within vertical display section 902 for compliance with specified approach procedures and vertical guidance. For example, vertical position indicator 411 may indicate an aircraft's position with respect to the required descent to MDA. The pilot may then utilize calculated descent rate 981 to begin a descent to MDA at the location specified by the approach procedures and displayed within vertical display section 902.

Figure 13:
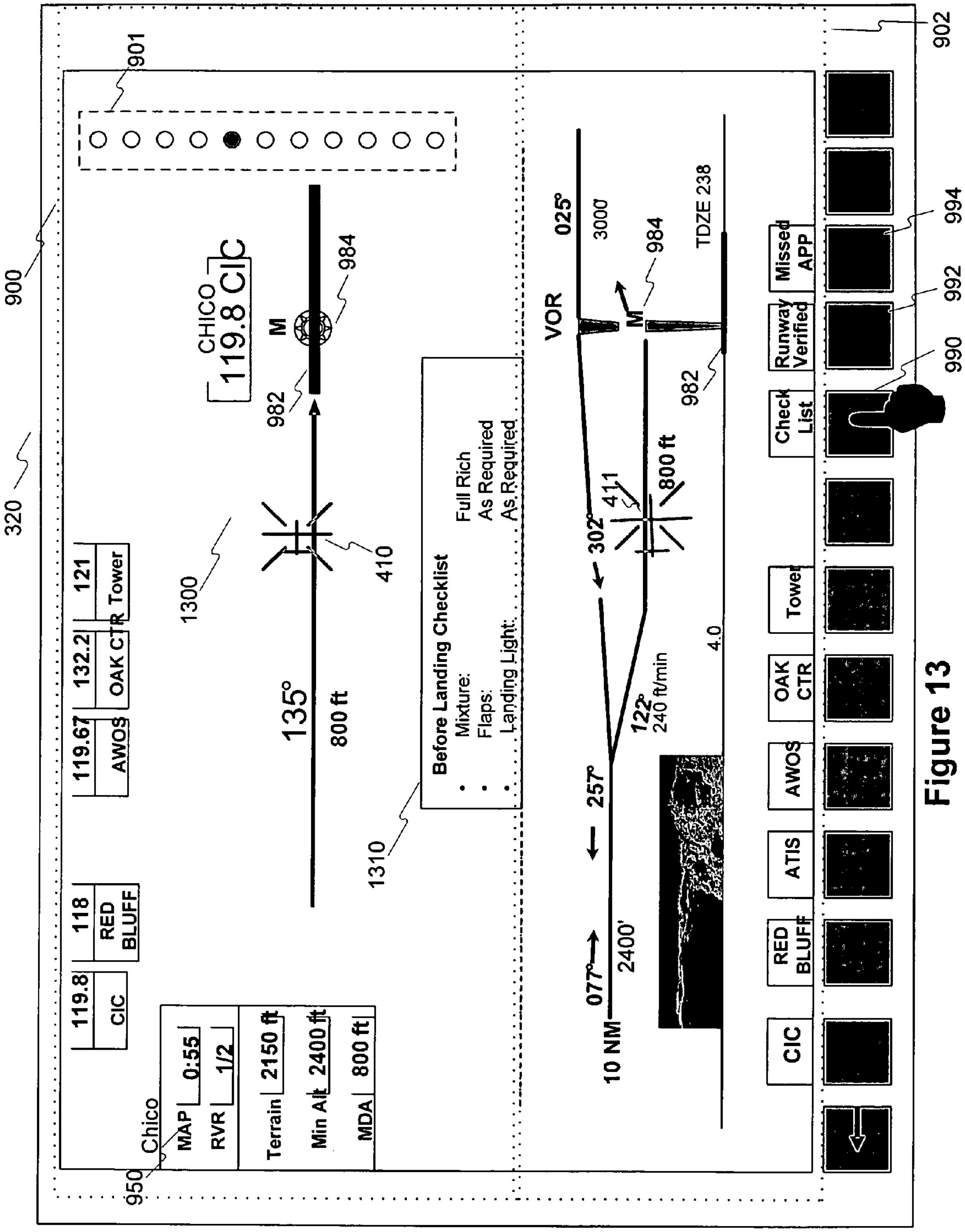
FIG. 13 is an exemplary illustration of a MFD as an aircraft has descended to the MDA, consistent with one embodiment of the present disclosure.

FIG. 13 is an exemplary illustration of a MFD following descent to an MDA consistent with one embodiment of the present disclosure. Once an aircraft has descended to an MDA, the pilot may attempt to visually confirm runway 982, or in the case of a precision approach, determine whether missed approach procedures should be executed by the DH. Computer 205 may cause final approach display 1300 to be displayed within lateral display section 900. Final approach display 1300 may zoom in on the final approach heading and runway enabling pilot to determine where runway 982 should be located relative to aircraft position based on aircraft position indicator 410. The pilot may also make corrections to aircraft heading based on aircraft position indicator 410 and lateral guidance display 901, among other things.

In addition, computer 205 may cause aircraft position indicator 410 and vertical position indicator 411 to become highlighted. Such highlighting may be a reminder to pilot that the aircraft is on final approach with limited time to visually verify the runway. Highlighting of the indicators may serve many other purposes as well, for example, as a reminder to the pilot to actuate checklist option selector 990. Actuation of checklist option selector 990 may cause computer 205 to display a final approach checklist 1310 on MFD 320. Final approach checklist 1310 may provide reminders and information related to aircraft settings during final approach. For example, final approach checklist 1310 may remind the pilot to lower the landing gear, turn on landing light, place flaps in the desired position, and set the fuel mixture appropriately, among others. A pilot may actuate final approach checklist as desired.

Further, where computer 205 is configured to receive spoken commands via voice recognition, the pilot may speak a command to request final approach checklist 1310. In such an embodiment, voice recognition software may translate the spoken command and cause the display of final approach checklist 1310 by computer 205. Further, computer 205 may automatically present final approach checklist 1310 as the aircraft nears runway 982 without pilot action.

Also during final approach, computer 205 may continue to cause timer 950 to display the estimated time to arrival at MAP 984. For example, based on the aircraft's current position relative to MAP 984, timer 950 may display "0:55," indicating 55 seconds until the aircraft reaches MAP 984. Alternatively or in conjunction, a pilot may receive audible indications of time to MAP 984. Audible indications may come as voice indications, beeps, or other recognizable sounds.

During a non-precision approach, where a pilot is able to visually verify runway 982 and confirm that RVR meets the requirement specified in the approach procedures, the pilot may actuate runway verification selector 992. Actuation of runway verification selector 992 may cause computer 205 to calculate and display a generated glideslope and/or calculated descent rates based on factors discussed in greater detail above with reference to FIG. 9. For example, upon visually confirming runway 982, a pilot may actuate runway verification selector 992. Computer 205 may then calculate (e.g., based on distance to the runway and current velocity of the aircraft) and display on MFD 320 a descent rate to smoothly land the aircraft on runway 982. Pilot may then use the calculated glideslope and/or descent rates along with vertical guidance display (not shown) to safely descend the aircraft to runway 982 for landing.

During a precision approach, computer 205 may display electronic glideslope information received from equipment present at runway 982. The pilot may then utilize such information to assist in intercepting and navigating in accordance with the glideslope. Upon reaching the DH, the pilot must determine whether to continue to land the aircraft or execute missed approach procedures. For example, where a DH of 560 feet is specified, a pilot on final approach may descend on the glideslope to 560 feet (as displayed on the altimeter) at which point, the pilot may decide whether to continue landing. Where the pilot determines that a landing should occur, the aircraft may continue to descend the glideslope to runway 982 for landing. Alternatively, the pilot may execute missed approach procedures, which will be discussed in greater detail with reference to FIG. 14.

Figure 14:
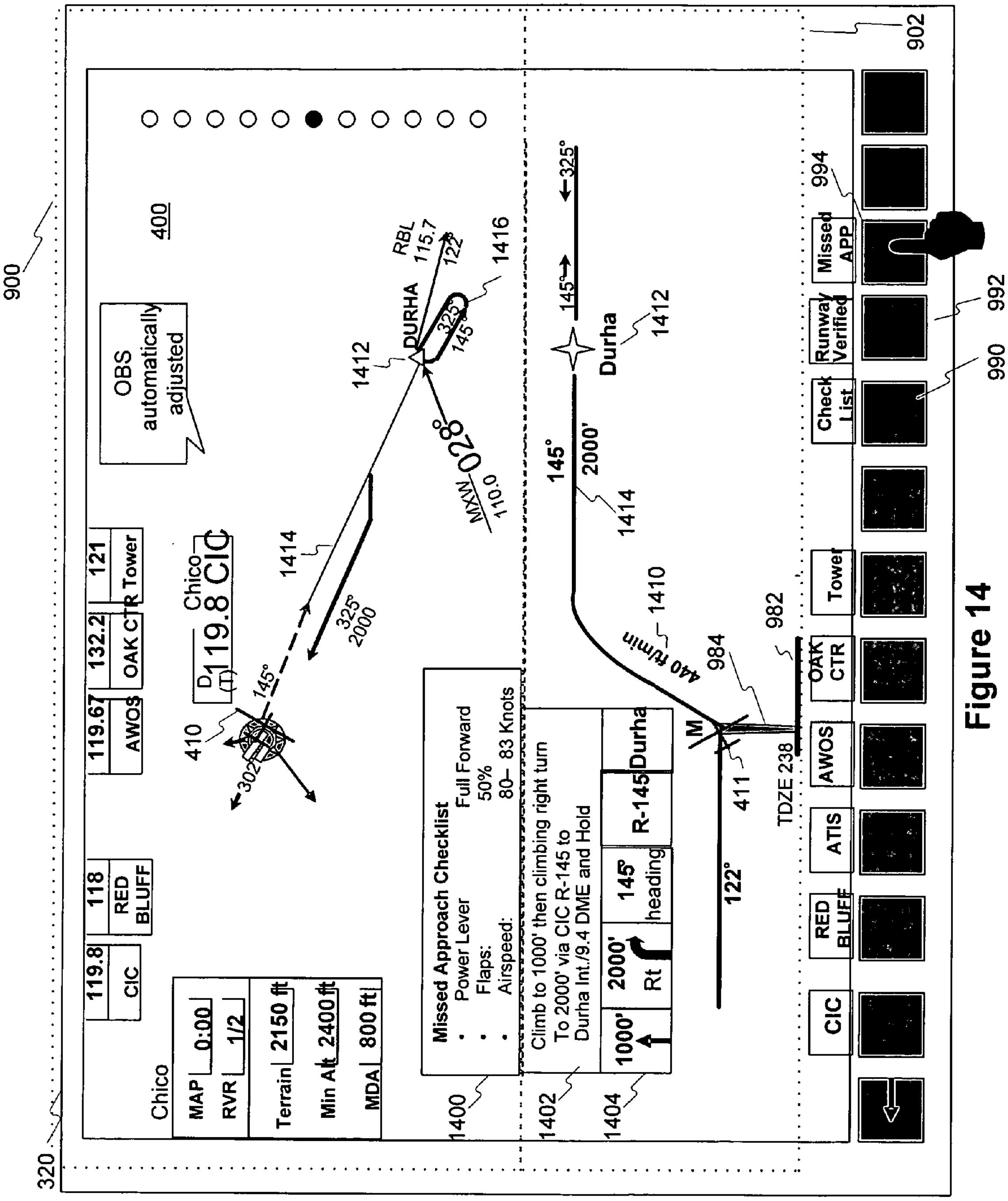
FIG. 14 is an exemplary illustration of a MFD as an aircraft arrives at the missed approach point, consistent with one embodiment of the present disclosure.

FIG. 14 is an exemplary illustration, consistent with one embodiment of the present disclosure, of a MFD following an aircraft's arrival at MAP 984. Upon arrival at MAP, or a determination at DH that a landing should be aborted, a pilot may execute the specified missed approach procedures. Missed approach procedures may be promulgated by the aviation regulating authority and must be strictly followed to avoid potential problems. Once it is determined that missed approach procedures will be executed, a pilot may first actuate missed approach option selector 994 causing computer 205 to enter "Missed Approach" mode. Alternatively, where computer 205 is configured to receive spoken commands via voice recognition software, a pilot may speak a command to activate "Missed Approach" mode. In such an embodiment, voice recognition software may translate the spoken command and cause computer 205 to enter "Missed Approach" mode. Further, computer 205 may automatically enter "Missed Approach" mode where computer 205 determines that MAP 984 has been reached.

Upon entering "Missed Approach" mode, computer 205 may cause lateral display section 900 to zoom out, resulting in display of a larger area of moving map 400. For example, zooming out may again reveal portions of the moving map including waypoint 1412, radial 1414, and published holding pattern 1416 on moving map 400. In addition, aircraft position indicator 410 may be displayed to provide position information relative to the surrounding references. A pilot may then use aircraft position indicator 410 on moving map 400 to assist in navigating through the missed approach procedures. It is important to note that more or fewer items may be displayed within lateral display section 900 upon entering "Missed Approach" mode.

Missed approach checklist 1400 may also be displayed upon entering "Missed Approach" mode. Missed approach checklist 1400 may display information related to executing the missed approach procedures. Such information may include, gear information, throttle information, flaps information, and airspeed for flying the missed approach. For example, missed approach checklist 1400 may indicate that on the missed approach, throttle should be increased to full throttle, flaps should be adjusted to 50 percent, and airspeed should be held at 80-83 knots. Missed approach checklist 1400 may also be presented automatically to the pilot by computer 205.

Computer 205 may also cause MAP text window 1402 and MAP graphics window 1404 to be provided upon entering "Missed Approach" mode. MAP text window 1402 and MAP graphics window 1404 may provide information related to the specified missed approach procedures for a runway/approach combination. Information may include, for example, ascent altitude, heading, waypoint, and subsequent procedures. For example, missed approach procedures for runway 982 may call for climbing to 1000 feet, executing a right turn and climbing to 2000 feet such that the aircraft is then on a 145 degree heading via CIC radial 145 to Durha waypoint. Upon arriving at Durha waypoint, the pilot should hold on published holding pattern. MAP text window 1402 may provide such instructions in a readable text format while MAP graphics window 1404 may provide similar information in a quickly recognizable graphics format. Both windows may be displayed, or alternatively, one or the other may be displayed based on preferences of the pilot.

A pilot may be required to execute the missed approach procedures as stated, and may utilize information obtained from moving map 400, vertical display section 902, and aircraft instruments, among other things, to assist in accurately executing the missed approach procedures. For example, aircraft position indicator 410 and vertical position indicator 411 may be displayed relative to other references on moving map 400 and vertical display area, respectively. Additionally, computer 205 may calculate a preferred ascent rate 1410 based on altitudes and distances specified in the missed approach procedures. For example, based on the specified ascent altitude of 2000 feet with a right turn beginning at 1000 feet, computer 205 may calculate an initial ascent rate of 440 feet per minute. A pilot may use such information to navigate, according to the specified missed approach procedures, to the holding pattern 1416 at waypoint 1412. For additional information on flying a published or unpublished holding pattern, see, for example, U.S. patent application Ser. No. 11/325,497, entitled "Apparatus and Method for Determining and Displaying a Holding Pattern," filed Jan. 5, 2006.

Using apparatus and systems consistent with the present disclosure, a pilot may easily view navigation information related to a selected runway/approach combination with little or no pilot action. Pilots may save valuable time and lighten cockpit workload so that efforts may be directed at more important flight tasks.

Other embodiments of the disclosure will be apparent to those skilled in the art from consideration of the specification and practice of the disclosed systems and methods. For example, computer 205 may link to an aircraft's automatic pilot system in order to assist pilot in navigating a selected approach according to specified approach procedures. By using approach information, aircraft navigation information, and published charts, cockpit workload may be significantly reduced. Such functions are made possible by the ability to receive navigation information about an approach, correlate such information with published navigational charts stored in an aircraft's onboard computer system, and compute, based on the information, approach related navigational information.

It is intended that the specification and examples be considered as exemplary only, with a true scope and spirit of the disclosure being indicated by the following claims.

I claim:

1. A method for determining and displaying information related to an approach for an aircraft, the method comprising:

receiving a flight plan;

determining flight plan information based on the flight plan;

receiving an approach for an airport;

determining approach information based on the approach including navigation information, wherein the navigation information includes at least one navigational fix and an identification for the navigational fix;

comparing the flight plan information with the approach information to confirm the approach is appropriate based on the flight plan;

displaying the approach information on a display device in the aircraft relative to a position of the aircraft;

presenting the navigational fix on the display during the approach; and providing the identification for the navigational fix on the display during the approach.

2. The method of claim 1, wherein displaying the approach information includes displaying a graphical representation of the approach information relative to a geographical representation of an aircraft location and a vertical representation of an aircraft elevation on a display device in the aircraft.

3. The method of claim 1, wherein the navigation information includes at least one of lateral guidance information and vertical guidance information.

4. The method of claim 3, wherein the vertical guidance information includes at least one of aircraft altitude information, glideslope information, descent rate information, altitude deviation information, and altitude correction information.

5. The method of claim 3, wherein the lateral guidance information includes at least one of heading information, heading deviation information, and heading correction information.

6. The method of claim 3, wherein navigation of an aircraft according to the at least one of lateral guidance and vertical guidance results in an approach compliant with specified approach procedures.

7. The method of claim 1, wherein the approach is an ILS approach, a VOR approach, a GPS approach, an NDB approach, or a Localizer approach.

8. The method of claim 2, wherein the aircraft location is displayed relative to approach plate information.

9. The method of claim 1, wherein the approach information further includes a missed approach point.

10. The method of claim 9, wherein the approach information further includes an estimated time of arrival at the missed approach point.

11. The method of claim 10, further including:

receiving an indication of a missed approach;

identifying missed approach navigation information related to the destination airport; and displaying the missed approach navigation information on the display device.

12. The method of claim 11, wherein the missed approach navigation information includes a missed approach checklist.

13. The method of claim 12, wherein the missed approach checklist includes at least one of gear information, throttle information, flaps information, and velocity information.

14. The method of claim 13, wherein the missed approach navigation information further includes at least one of ascent altitude, a heading, and a waypoint.

15. The method of claim 14, wherein the indication is received as a result of manual input.

16. The method of claim 15, wherein the indication is received automatically as a result of calculations performed by a flight computer.

17. The method of claim 1, wherein the approach information further includes terrain information.

18. The method of claim 17, wherein the terrain information includes at least one of terrain maximum altitude, a terrain indicator, a terrain photograph, and a terrain video.

19. The method of claim 1, wherein the approach information further includes one or more frequencies related to at least one navigational aid.

20. The method of claim 19, further including receiving a selection of the one or more frequencies.

21. The method of claim 19, further comprising:

automatically tuning at least one aircraft device to the received selection.

22. The method of claim 21, further comprising:

updating at least one aircraft instrument according to the approach information.

23. The method of claim 3, further comprising:

providing information to an auto-pilot to fly the approach.

24. The method of claim 1, further including:

displaying at least one approach option as a selectable hotspot on the display device.

25. The method of claim 1, wherein receiving the approach is manual.

26. The method of claim 1, wherein receiving the approach is provided via vocal commands converted to digital data using vocal recognition.

27. The method of claim 1, wherein receiving the approach is received in an analog format.

28. The method of claim 27, further comprising:

converting the selection received in an analog format to digital data.

29. The method of claim 28, wherein the digital data is provided directly to a device configured to determine the approach information.

30. The method of claim 1, wherein receiving the approach is provided by digital data.

31. The method of claim 30, wherein the digital data is provided via datalink.

32. The method of claim 31, wherein the datalink is ADB-S.

33. The method of claim 28, further comprising:

receiving the approach manually;

comparing the approach with the airport information based on navigational data;

and;

confirming that the approach is correct based on the navigational data.

34. The method of claim 1, wherein the display device is a multi-function display.

35. The method of claim 1, wherein the display device is a heads-up display.

36. The method of claim 1, wherein the approach is an instrument approach to an airport, a departure procedure from an airport, or an arrival procedure to an airport.

37. The method of claim 1, further including providing information related to the at least one navigational fix.

38. The method of claim 37, wherein the information related to the at least one navigational fix includes at least one of a frequency, a latitude, a longitude, a GPS coordinate, an identifier, a type, and a status.

39. The method of claim 1, further including:

displaying one or more amenities at the airport on the display device.

40. The method of claim 39, wherein the one or more amenities displayed on the display device are selectable.

41. The method of claim 40, wherein the one or more amenities include at least one of an FBO, a fuel facility, a restaurant, a repair facility, and a lodging facility.

42. The method of claim 41, wherein selecting one of the one or more amenities causes display of additional information related to the selected amenity.

43. The method of claim 42, wherein the additional information includes at least one of a fuel price, a fuel grade, a restaurant cuisine, repair facility information, and lodging information.

44. The method of claim 1, wherein the approach information further includes weather information including at least a ceiling and a visibility at the airport.

45. The method of claim 1, further including:

providing an alert when a result of the comparison indicates the approach is not appropriate.

46. A system for determining and displaying information related to an approach for an aircraft, the system comprising:

a flight plan receiving component configured to receive a flight plan;

a flight plan determining component configured to determine flight plan information;

a receiving component configured to receive an approach for an airport;

a determining component configured to determine approach information based on the approach including navigation information, wherein the navigation information includes at least one navigational fix and an identification for the navigational fix;

a comparison component configured to compare the flight plan information with the approach information to confirm the approach is appropriate based on the flight plan;

a displaying component configured to display the approach information on a display device in the aircraft relative to a position of the aircraft;

a presenting component configured to present the navigational fix on the display during the approach; and a providing component configured to provide the identification data for the navigational fix on the display during the approach.

47. The system of claim 46, wherein displaying the approach information includes displaying a graphical representation of the approach information relative to a geographical representation of an aircraft location and a vertical representation of an aircraft elevation on a display device in the aircraft.

48. The system of claim 46, wherein the navigation information includes at least one of lateral guidance information and vertical guidance information.

49. The system of claim 48, wherein the vertical guidance information includes at least one of aircraft altitude information, glideslope information, descent rate information, altitude deviation information, and altitude correction information.

50. The system of claim 48, wherein the lateral guidance information includes at least one of heading information, heading deviation information, and heading correction information.

51. The system of claim 48, wherein navigation of an aircraft according to the at least one of lateral guidance and vertical guidance results in an approach compliant with specified approach procedures.

52. The system of claim 46, wherein the approach is an ILS approach, a VOR approach, a GPS approach, an NDB approach, or a Localizer approach.

53. The system of claim 47, wherein the aircraft location is displayed relative to approach plate information.

54. The system of claim 46, wherein the approach information further includes a missed approach point.

55. The system of claim 54, wherein the approach information further includes an estimated time of arrival at the missed approach point.

56. The system of claim 55, further including:

a missed approach receiving component configured to receive an indication of a missed approach;

an identifying component configured to identify missed approach navigation information related to the destination airport; and a missed approach displaying component configured to display the missed approach navigation information on the display device.

57. The system of claim 56, wherein the missed approach navigation information includes a missed approach checklist.

58. The system of claim 57, wherein the missed approach checklist includes at least one of gear information, throttle information, flaps information, and velocity information.

59. The system of claim 58, wherein the missed approach navigation information further includes at least one of ascent altitude, a heading, and a waypoint.

60. The system of claim 59, wherein the indication is received as a result of manual input.

61. The system of claim 60, wherein the indication is received automatically as a result of calculations performed by a flight computer.

62. The system of claim 46, wherein the approach information further includes terrain information.

63. The system of claim 62, wherein the terrain information includes at least one of terrain maximum altitude, a terrain indicator, a terrain photograph, and a terrain video.

64. The system of claim 46, wherein the approach information further includes one or more frequencies related to at least one navigational aid.

65. The system of claim 64, further including:

a frequency receiving component configured to receive a selection of the one or more frequencies.

66. The system of claim 64, further comprising:

a tuning component configured to automatically tune at least one aircraft device to the received selection.

67. The system of claim 66, further comprising:

an updating component configured to update at least one aircraft instrument according to the approach information.

68. The system of claim 48, further comprising:

an auto-pilot providing component configured to provide information to an auto-pilot to fly the approach.

69. The system of claim 46, further including:

a hotspot providing component configured to provide at least one approach option as a selectable hotspot on the display device.

70. The system of claim 46, wherein receiving the approach is manual.

71. The system of claim 46, wherein receiving the approach is provided via vocal commands converted to digital data using vocal recognition.

72. The system of claim 46, wherein receiving the approach is received in an analog format.

73. The system of claim 72, further comprising:

a converting component configured to convert the selection received in an analog format to digital data.

74. The system of claim 73, wherein the digital data is provided directly to a device configured to determine the approach information.

75. The system of claim 46, wherein receiving the approach is provided by digital data.

76. The system of claim 75, wherein the digital data is provided via datalink.

77. The system of claim 76, wherein the datalink is ADB-S.

78. The system of claim 73, further comprising:

an approach receiving component configured to receive the approach manually;

a comparing component configured to compare the approach with the airport information based on navigational data; and;

a confirming component configured to confirm that the approach is correct based on the navigational data.

79. The system of claim 46, wherein the display device is a multi-function display.

80. The system of claim 46, wherein the display device is a heads-up display.

81. The system of claim 46, wherein the approach is an instrument approach to an airport, a departure procedure from an airport, or an arrival procedure to an airport.

82. The system of claim 46, further including:

a fix providing component configured to provide information related to the at least one navigational fix.

83. The system of claim 82, wherein the information related to the at least one navigational fix includes at least one of a frequency, a latitude, a longitude, a GPS coordinate, an identifier, a type, and a status.

84. The system of claim 46, further including:

an amenities displaying component configured to display one or more amenities at the airport on the display device.

85. The system of claim 84, wherein the one or more amenities displayed on the display device are displayed as selectable hotspots.

86. The system of claim 85, wherein the one or more amenities include at least one of an FBO, a fuel facility, a restaurant, a repair facility, and a lodging facility.

87. The system of claim 86, wherein selecting one of the one or more amenities causes display of additional information related to the selected amenity.

88. The system of claim 87, wherein the additional information includes at least one of a fuel price, a fuel grade, a restaurant cuisine, repair facility information, and lodging information.

89. The system of claim 46, wherein the approach information further includes weather information including at least a ceiling and a visibility at the airport.

90. The system of claim 46, wherein the approach is an instrument approach to an airport, a departure procedure from an airport, or an arrival procedure to an airport.

91. The system of claim 46 further comprising:

an alert providing component configured to provide an alert when a result of the comparison indicates the approach is not appropriate.

* * * * *